United States Patent [19]
Hoss et al.

[11] Patent Number: 5,749,595
[45] Date of Patent: May 12, 1998

[54] TRAILER SUSPENSION

[75] Inventors: Gregg M. Hoss, Bedford; James E. Thompson, Ft. Worth; Thomas Franklin Johnson, Uvalde; Martin Kirbie, Grand Prairie; Andrew J. Speer, III, Arlington, all of Tex.

[73] Assignee: JHC Ventures, L.P., Irving, Tex.

[21] Appl. No.: 490,596

[22] Filed: Jun. 15, 1995

Related U.S. Application Data

[63] Continuation-in-part of Ser. No. 430,788, Apr. 27, 1995, Pat. No. 5,549,359, which is a continuation-in-part of Ser. No. 392,630, Feb. 22, 1995, Pat. No. 5,551,759.

[51] Int. Cl.$^6$ .................................................. B60G 5/00
[52] U.S. Cl. ................................. 280/688; 280/718
[58] Field of Search ............................... 280/718, 720

[56] References Cited

U.S. PATENT DOCUMENTS

| | | | |
|---|---|---|---|
| 2,663,231 | 12/1953 | Wood | 94/44 |
| 2,667,361 | 1/1954 | Jones | 280/718 X |
| 3,202,440 | 8/1965 | Apgar, Sr. | 280/104.5 |
| 3,759,573 | 9/1973 | Rosenbaum | 298/29 |
| 4,289,353 | 9/1981 | Merritt | 298/22 R |
| 4,527,939 | 7/1985 | Suarez | 414/382 |
| 4,573,850 | 3/1986 | Suarez | 414/382 |
| 4,576,398 | 3/1986 | Kinne | 280/789 |
| 4,871,188 | 10/1989 | Baxter | 280/680 |
| 4,948,324 | 8/1990 | Niederer | 414/415 |
| 5,006,039 | 4/1991 | Niederer | 414/786 |
| 5,470,096 | 11/1995 | Baxter | 280/712 |

*Primary Examiner*—Janice L. Krizek
*Attorney, Agent, or Firm*—Gardere & Wynne LLP; John W. Montgomery

[57] ABSTRACT

A rigidified suspension is provided for a load-carrying vehicle, such as a trailer for a dual use, belly-dumping and end-dumping trailer, of the type having a frame with left and right side beams connected together and to which frame wheels are mounted through a suspension. The rigidified suspension includes left and right suspension rails, which are provided having a forward end and a rearward end and are horizontally disposed inward from and below the left and right side beams of the frame. A rear plate is fastened to said left and right side beams of the frame and extends downward therefrom adjacent to the rearward end of the left and right suspension rails. A connector brace is rigidly fastened to the rear ends of the left and right rails and to the rear plate and thereby between each other and the frame. A forward suspension brace is provided, rigidly fastening the forward ends of the left and right suspension rails to the frame and to each other. An intermediate suspension brace is provided, rigidly fastening the left and right suspension rails to the frame at a position intermediate of the forward ends and said rearward ends, so that a rigid suspension system is constructed by which a plurality of wheel axles and wheels can be connected to the frame through short vertical attachment arms.

2 Claims, 14 Drawing Sheets

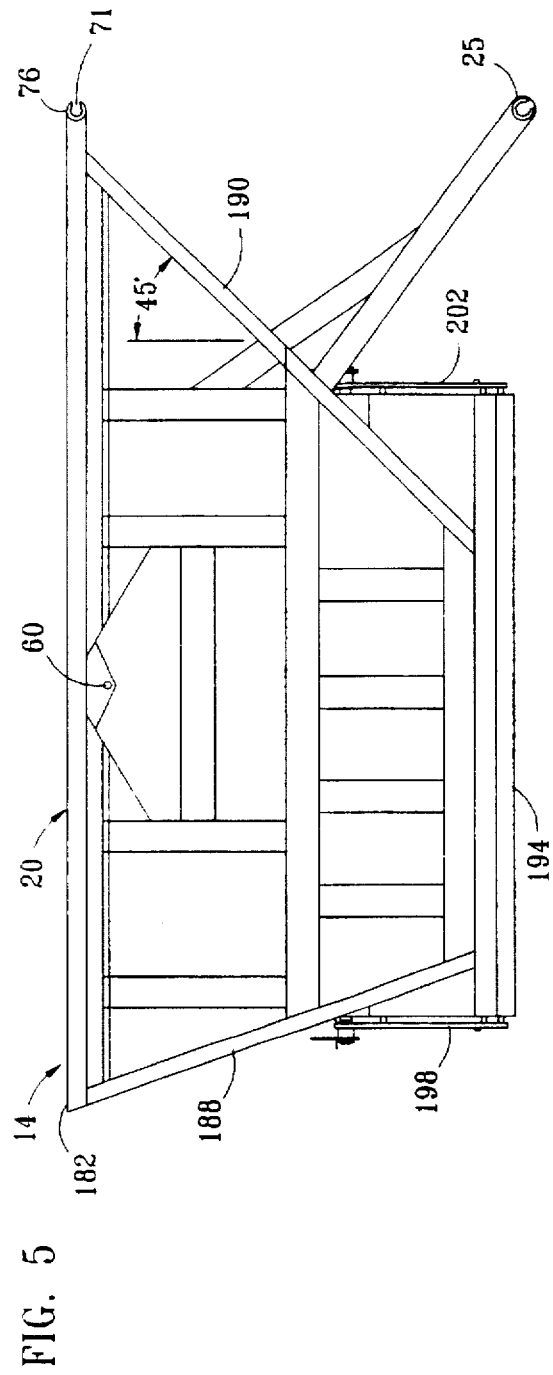
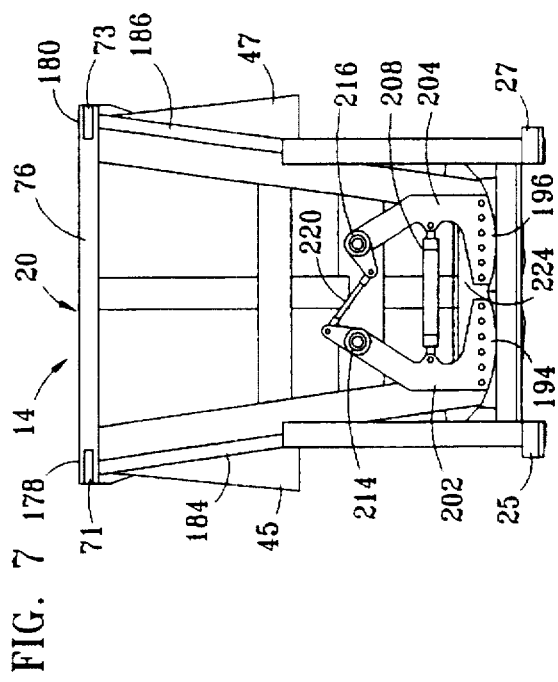
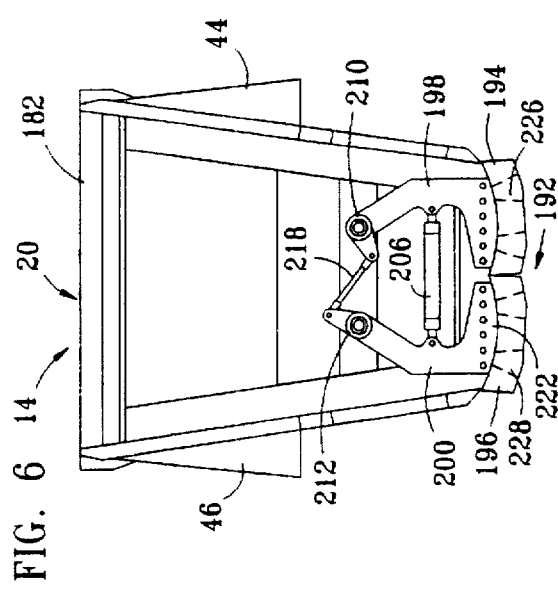

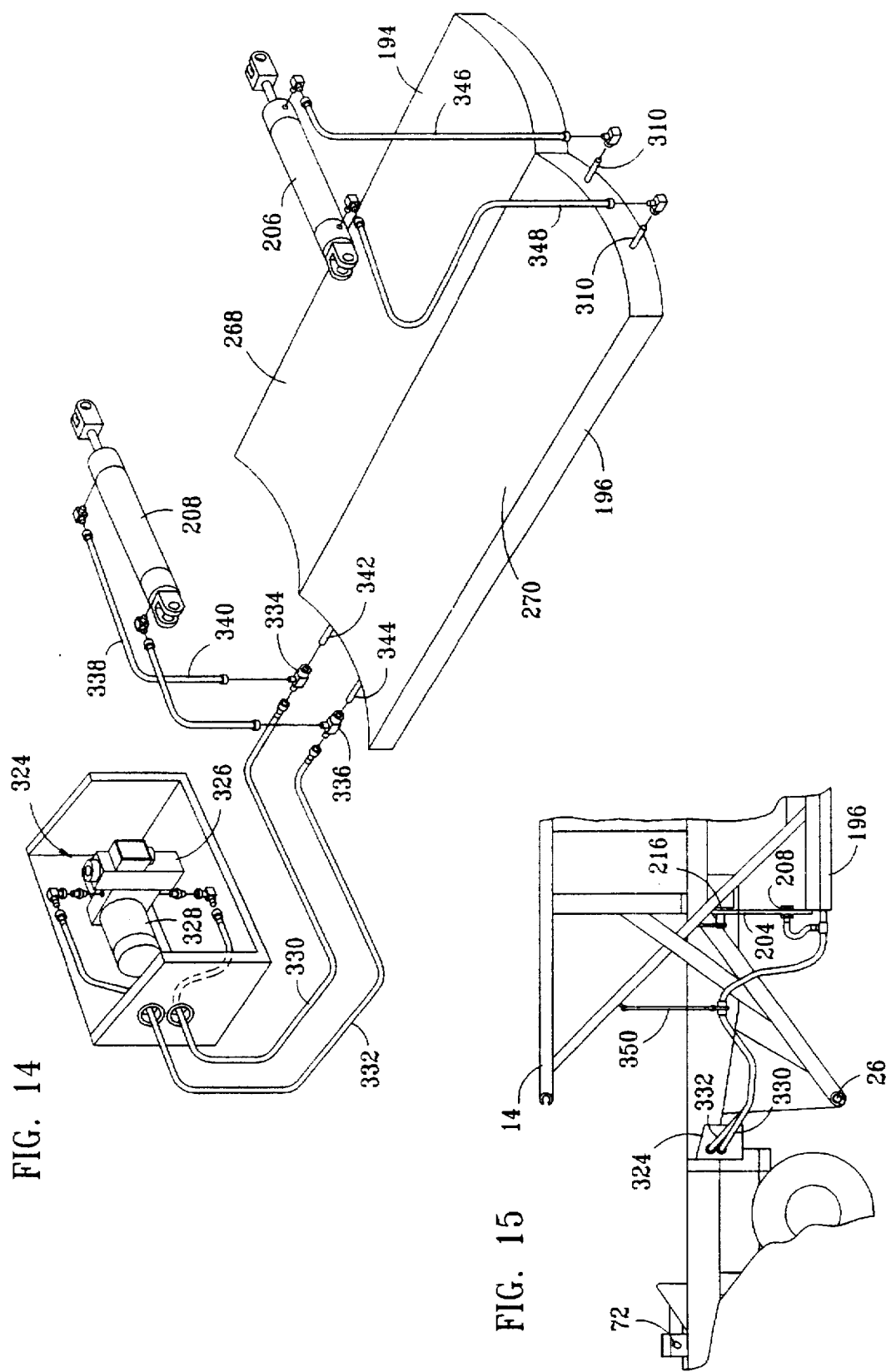

TRAILER SUSPENSION

CROSS-REFERENCE TO RELATED APPLICATIONS

This is a continuation-in-part patent application of co-owned U.S. patent application Ser. No.08/430,788, filed Apr. 27, 1995, now U.S. Pat. No. 5,549,359, which is a continuation-in-part patent application of co-owned U.S. patent application Ser. No. 08/392,630, filed Feb. 22, 1995, now U.S. Pat. No. 5,551,759, both of which patent applications are relied on herein for priority and are incorporated herein by reference as if fully set forth for all purposes.

TECHNICAL FIELD OF THE INVENTION

The present invention relates to a dual use vehicle having capabilities of transporting materials in a hopper from which the materials may be dumped from the bottom of the hopper or dumped from the end of the hopper, and particularly to a dual use trailer with improved belly-dumping capabilities.

BACKGROUND OF THE INVENTION

In the past, vehicles for the purpose of transporting sand, gravel, paving materials and other loose materials which are relatively heavy have often been required to be specialized, either for the type of materials which must be carried or for the particular conditions under which the vehicles must operate. Many vehicles are primarily used in general construction for conveying, moving or delivering large quantities of sand, concrete, rocks, earth or paving materials. Often, large quantities of materials must be transported long distances over existing roadways. Depending upon the particular application, the transported materials may need to be dumped from the belly of the vehicle. Sometimes, vehicles may be required which allow the materials to be dumped from the end of the vehicle. In the past, vehicles which dumped from the belly typically required one specific type of construction. Other vehicles which dumped from the end, as by raising the front end of a truck bed and letting the contents slide through a tailgate, required a different type of construction.

Some types of work or construction may have enough use for a particular specialized dumping activity to justify constructing a particular type of vehicle for the intended purpose, whether belly dumping or end dumping. Other jobs may require more than one specialized dumping capability. Often, there is a need to have one or only a few transport and dumping vehicles which might be useful for multiple purposes. Typically, trailers and vehicles are available only for one particular purpose, as, for example, the end-dumping trailers shown in U.S. Pat. Nos. 2,718,429; 2,983,548; and 3,232,666. However, these various types of end-dumping vehicles are entirely without belly-dumping capabilities. Belly-dumping vehicles have also been known; however, such vehicles typically are highly specialized for the particular belly-dumping operation intended, without end-dumping capabilities.

An early attempt to overcome the drawbacks of separate vehicles for specialized purposes included a combination belly-dump/end-dump vehicle for hauling materials, which was disclosed in U.S. Pat. No. 4,289,353. This disclosure showed a vehicle which was intended to be capable of either end dumping or belly dumping. The disclosure showed a vehicle, which included a frame mounted upon wheels and which provided a first pivot support and a second pivot support, with the first pivot support at least level with or lower than the second pivot support. A hopper for containing the materials to be transported and dumped was carried by the frame. The hopper was described as having a gate means located at the bottom for belly dumping. In its lowered or transport position, an arm from the rear of the hopper engaged the first pivot support. A telescopic ram was provided between the front of the frame and the front of the hopper for raising the front end of the hopper and for lifting the hopper rotatably about the first pivot support. After pivoting to a particular angle and before dumping was initiated, a top edge of the hopper became pivotably engaged with the second pivot support. The first and second pivots were alternately engaged upon hydraulically raising the front end of the hopper so that the materials dumped out of the rear of the hopper over the rear of the frame, preferably only after the second pivot engagement occurred. The vehicle disclosed provided the first pivot support ahead of the rear wheels. The second pivot support was shown positioned behind the rear wheels of the vehicle to permit dumping the contents behind the vehicle, not on the frame or rear wheels. Thus, unless the trailer vehicle was securely attached downward in the front, a heavy load in a fully tilted hopper acted downward on a "lever" extending behind the rear axle and could cause a tendency to lift the front end of the trailer. Also, the telescopic hydraulic cylinder was attached ahead of the hopper, apparently for maximum leverage when pivoting the hopper. This construction required an extremely long hydraulic cylinder stroke to fully pivot the hopper. A hydraulic cylinder with a large number of telescoping hydraulic stages would be required for a vehicle with this design. Also, the frame for the vehicle, as disclosed, was of a construction requiring multiple side beams extending from the front to the rear of the vehicle along the sides of the hopper to be supported. Upper and lower parallel side beams were provided on each side of the hopper, apparently to provide adequate strength and stability for a fully loaded hopper.

Further, the alternatingly engageable pivot support connections were depicted as including round bar stock pivot bars attached to the hopper and semicircular sockets secured, upwardly directed, on the vehicle for pivotably receiving the pivot bars of the hopper. These upwardly directed sockets did not hold the hopper downward in place when transporting. The weight of the hopper and payload and the hydraulic cylinder attachment were relied upon for holding the hopper down into the frame during transport. Further, when the hopper pivot bars were not engaged in the upwardly opened pivot sockets, the sockets could accumulate rocks, gravel or other materials, as, for example, from loading or unloading the payload. Thus, the lower pivot supports or sockets could accumulate debris when the hopper was pivoted rearward and engaged in the upper pivot sockets for end dumping. The upper sockets could accumulate debris when the hopper is in its lowered/non-pivoted position. When the pivot bars engaged and rotated in the sockets, unnecessary wear and abrasion resulted.

Prior trailers, having belly-dumping capability, were typically provided with bay doors, which typically had to be continuously maintained in a closed position with externally applied force, as with a pneumatic cylinder. The doors were typically actuated to either a fully closed position for filling and transport or to a fully open position for dumping the load of material. The weight of the load in such prior hopper designs continuously acted to push the doors to an open position.

In some alternative embodiments of hopper doors, such as those depicted in U.S. Pat. No. 4,289,353, a "clamshell gate"

was described as being operated, either hydraulically or pneumatically. The means of operation was not fully described in the '353 patent, as it was said that the operation thereof was known in the art. However, as depicted in the drawings of the '353 patent, the clamshell gates had a substantially continuous arcuate shape, with the lowest part of the arc along the center line of the hopper. Large actuating cylinders were provided to pivot the clamshells either fully closed or fully open. The actuating cylinders were typically air-operated cylinders, which were convenient for purposes of the use of tractor/trailer rigs of the type commonly fitted with air brakes and a corresponding air pressure-generating system. Such pneumatic cylinders did not lend themselves to partial opening, but rather were either fully actuated to an open position or fully actuated to a closed position. Unless a mechanical latch was also used to maintain the clamshell gate into a closed position, the air-operated cylinders would need to maintain a seal so that either pressure or vacuum, depending on the configuration, kept the doors in a closed position until such time as the doors were to be opened, when the cylinders would be actuated so that the gates or the doors would be moved outward to a fully open position. Thus, in these devices, it appears that the forces of granular material against the clamshell doors continuously tended to open the doors.

The opening of the doors with "on" or "off" pneumatic type actuators was sufficiently quick so that one need not be concerned with which of the doors opened first or fastest. Both of the doors, if operating properly, moved swiftly to the fully open position to allow for complete dumping.

Most earlier trailers, of all types, which have had multiple rear wheel assemblies, have had a plurality of vertically extending support struts, typically interposed between each axle, or each set of wheels. The support struts were constructed of a rigid material, supported from a horizontal frame member, above. These support struts were typically made in pairs, one on either side of the trailer. At the lower end of each support strut was a fastening means at which a spring, such as a leaf spring, was connected and suspended between a support strut ahead of an axle and a support strut behind an axle. In the case of two rear axles, typically three pairs of left and right support struts were used: one front pair, one middle pair and one rear pair. The leaf springs were suspended from the middle struts toward the front strut and from the middle strut toward the rear strut. Attached to each of the leaf springs was an axle, and a shock absorber mechanism was also appropriately affixed. Because of the large diameter of the tires, the support struts were required to extend a substantial distance from the upper horizontal frame member, thereby requiring both substantial strengthening of the horizontal member, as well as substantial strengthening of the vertical struts. The vertical struts had to be designed against cantilever forces, acting at a significant lever arm distance from the attachment point at the horizontal frame member.

SUMMARY OF THE INVENTION

These and other deficiencies of the prior transport and dumping vehicles and trailers are overcome and other advantages are provided by the invention of an improved dual use belly- and end-dumping vehicle. In particular, a unique frame construction is provided, including an open frame concept using streamlined, low profile, improved strength, parallel box beams to support the hopper. Support struts are welded at spaced-apart locations along the interior of each box beam to provide additional stability, so that only one beam is required on each side of the frame. A particular advantageously strong construction has been found to result from alternatingly welding interdigitated vertical support struts along the left inside and then the right inside of each box beam.

Another aspect of the invention is the use of an angled rear chute for effectively moving the end-dumped materials past the end of the trailer. By using the angled chute, the second pivot point may be advantageously positioned ahead of the rearmost wheels. The rear chute carries dumped materials past the rearmost wheels for unobstructed dumping behind the trailer. The pivot point ahead of the rearmost wheels avoids undesired tipping or lifting of the front of the vehicle. Further, the rear chute is advantageously provided with a high temperature resistant, reduced wear and reduced friction, plastic sheet material which facilitates smooth dumping and is particularly useful for dumping sticky materials, such as asphalt, concrete or other sticky aggregate materials. Advantageously, the sheet of plastic can be removably attached for convenient replacement.

An additional advantageous feature of the invention is in the use of guide baffles within the rear interior of the hopper for purposes of directing discharged materials for smooth flow out of the end dumping chute. This feature has been found to be particularly advantageous in connection with dumping sticky materials, such as hot asphalt or aggregate material. The guide baffles reduce clumping of the materials, and particularly sticky materials, such as asphalt, as they are dumped, so that a smooth layer of asphalt or other sticky materials may be accomplished with the end-dumping feature of the dual-use trailer, according to the present invention.

Another advantageous feature of the invention is that the bay doors are constructed and pivotably mounted so that the weight of the load tends to hold the doors in a closed position, but is not so great that the doors must be actuated with a large pneumatic cylinder. A mounting pivot point is selected at each end of the trailer for each of the doors, separately, which pivot point is closer to the center line of the hopper than the center of force acting on that particular door. Thus, the two pivot points for the two doors are spaced from the center line less than halfway to the side walls of the hopper. In this manner, the force of the center line of the weight holds the doors toward a closed position, according to the weight of the load, but is not so large that it cannot be overcome with a reasonably sized hydraulic cylinder. Another feature of the doors is that because they are hydraulically actuatable without extreme amounts of weight tending to pivot the doors in either direction, they may be opened to a selectable sized opening. This allows a controllable rate of dumping from the belly. It also allows the operator to dump the materials in spaced-apart locations, such as spaced-apart wind rows, according to the size of the partial opening of the belly bay doors, which beneficially allows spreading the deposited material later with less effort than might be required if all the material is dumping in the same location. As the material need not be fully dumped, it is not always necessary to have a reservoir or a space below the vehicle for dumping the load from the belly.

Another aspect of the invention is that each of the belly doors has a radius of curvature which corresponds to the radius from the separate pivot points. This gives the doors, when closed, a double concave appearance which maintains additional clearance under the vehicle while still allowing the doors to pivot beyond the lower edges of the hopper.

Another feature of the belly doors is that they are interconnected, one with the other, with a unique timing mechanism so that each door opens the same amount as the other when the hydraulic cylinder is actuated. The linkage mechanism or the timing mechanism also has an adjustable length in each direction so that the doors may be adjusted to contact each other at a center line, thereby completely closing the hopper opening without any undue gap resulting. Inaccuracies or maladjustment, as, for example, misalignment due to wear or due to manufacturing tolerances, can be adjustably corrected without rebuilding the entire mechanism.

Another feature of the invention is that a unique reinforced, ribbed construction of the doors is disclosed which provides additional strength along the entire length of the hopper opening to reduce bending, even under heavy loads. It also provides a convenient protective structure, by which interconnecting hydraulic pipelines may extend from actuated cylinders at the front end and the back end, by which both cylinders are actuated simultaneously and controllably. This both shortens the length of hydraulic piping required, and further minimizes the risk of damage of hydraulic piping which might otherwise need to be sufficiently lengthy to provide enough slack for the hopper to be lifted to an end-dumping position.

A further advantageous feature of the present invention is the use of an electrically-driven hydraulic pump for actuating the bay door cylinders. The hopper is designed to both dump from the belly, and also to dump from the end. For end-dumping, the hopper is successively pivoted about lower and upper pivot positions located toward the rear of the vehicle. Thus, advantageously, an electrically-driven hydraulic pump is located toward the rear of the vehicle, adjacent to, or preferably between the lower pivot axis and the upper pivot axis. In this manner, the hydraulic lines from the pump to the hopper may be substantially shorter than hydraulic lines which might otherwise extend from the truck cab or from a power takeoff from a tractor for operating the belly doors. Convenient electrical control lines, rather than cumbersome hydraulic lines, can be used to provide control from a remote location, such as from the cab of a truck.

Another aspect of the present invention is to provide two side-mounted hydraulic cylinders, which act in parallel and which are strategically positioned with respect to the dimensions of a particular vehicle or trailer for providing both an adequate lifting force and also an acceptably short cylinder stroke. In particular, shortening the cylinder stroke allows the use of telescopic hydraulic cylinders with a reduced number of stages. This facilitates the use of two pivot points for end dumping, while providing maximum stability, strength and lifting force in the cylinders because of the reduced number of cylinder extension stages required for the parallel telescopic hydraulic cylinders.

A further aspect of the present invention is to provide a trailer suspension and method of construction which provides increased strength and rigidity, while minimizing additional weight and also reducing manufacturing costs. In particular, a trailer suspension support mechanism is provided, which has a lower horizontal support member suspended and supported from an upper horizontal support frame, with angular support struts, with both side angular supports and a horizontal transverse member support supported with an angular support plate from the upper horizontal frame members, as well as vertically extending strut members supported by the upper horizontal frame member. Thus, a rigid, triangularly supported pair of lower horizontal support bars are provided to which a plurality of short spring attachment struts are fastened so that a rigid suspension assembly is achieved.

BRIEF DESCRIPTION OF THE DRAWINGS

The foregoing objects, advantages, and features, as well as other objects and advantages, will become more apparent with reference to the description and drawings below, in which like numerals represent like elements and in which:

FIG. 5 is a side view of a belly-dumping and end-dumping hopper removed from the trailer frame;

FIG. 6 is a front elevation view of the hopper of FIG. 5.

FIG. 7 is a rear elevation view of the hopper of FIGS. 5 and 6.

FIG. 14 is a schematic perspective partial assembly view, depicting the attachment of a hydraulic hopper door cylinder mechanism, as well as an electrically-powered hydraulic pump assembly;

FIG. 15 is a schematic partial cut-away view of a vehicle, depicting an embodiment of a pump assembly and hydraulic connection lines mounted in the proximity of the end-dumping pivot points for the hopper assembly carried in a vehicle frame;

DETAILED DESCRIPTION OF THE PREFERRED EMBODIMENTS

Figure 1:
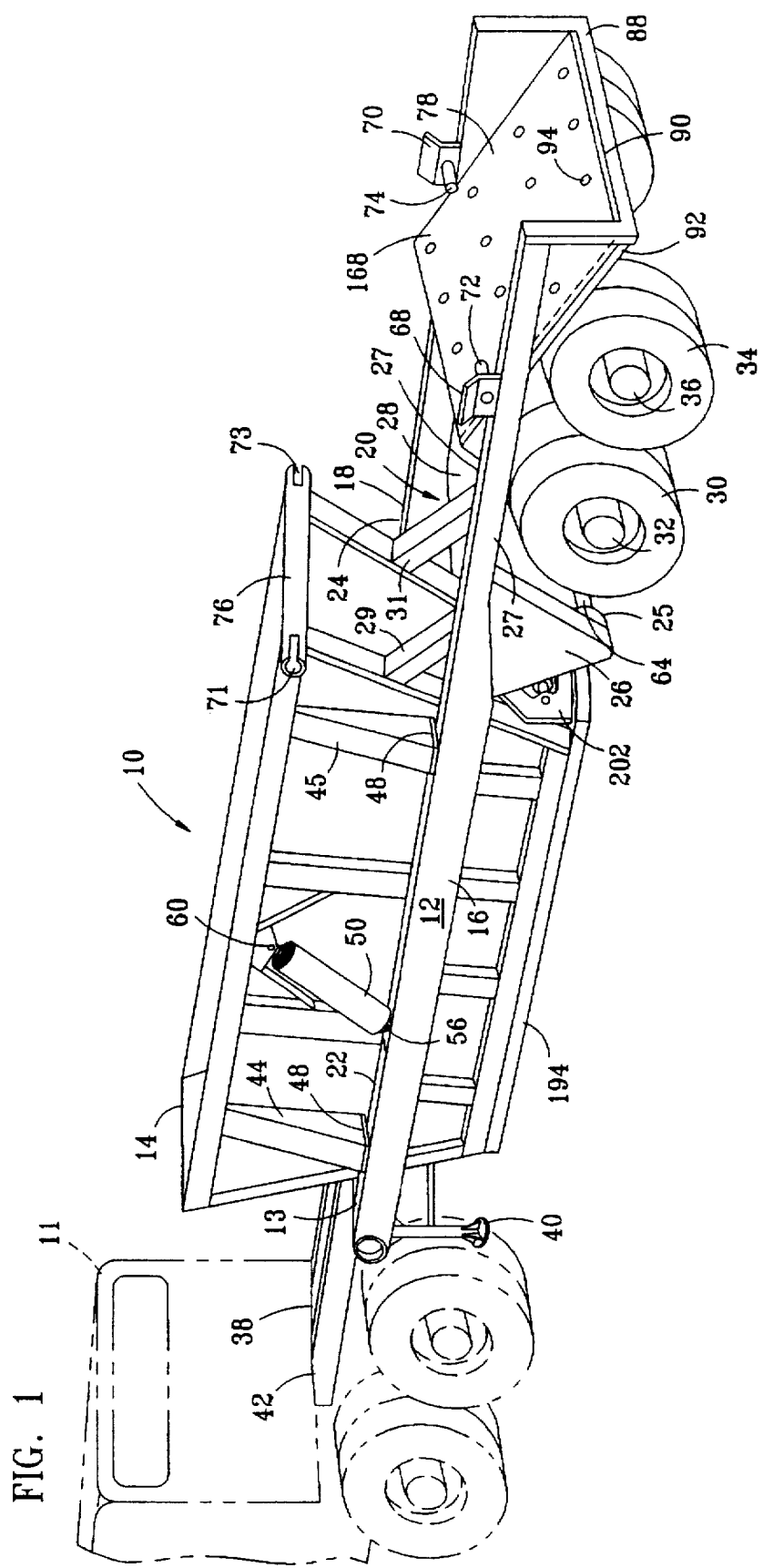
FIG. 1 is a side perspective view of an improved dual use bottom and end dumping trailer shown with the hopper in the secured, or bottom-dumping, position according to the present invention.

FIG. 1 shows a side perspective view of a materials transporting vehicle 10 having dual dumping capabilities, including bottom dumping and end dumping. The vehicle includes a frame 12, which is constructed for carrying a hopper 14 in which transported materials, such as gravel, sand, asphalt and other heavy materials, which exhibit some of the characteristics of fluid material in that they may be dumped or may flow either from the bottom bay doors of the hopper or from the end of a tipped hopper. The frame 12 may, for example, be constructed as a self-powered vehicle (not shown) or, preferably, may be advantageously constructed in the form of a semitrailer 13 which may be pulled with a truck tractor 11 (shown in phantom). This allows for the dual-use vehicle 10 to be formed with any standard trucking rig without requiring self-motorization.

The frame 12 includes a left-side frame 16 and a right-side frame 18. It will be noted that "left" and "right", as used herein, will be adopted according to the convention of a forward moving vehicle, viewing the vehicle from the rear so that the observer's left becomes the vehicle's left and the observer's right becomes the vehicle's right. Unless otherwise indicated, the vehicle 10, frame 12 or semitrailer 13 are typically bilaterally symmetrical so that the right side is a mirror image of the left side. A hopper receiving opening 20 is formed between the left- and right-side frames. A left-side hopper support surface 22 and a right-side hopper support surface 24 are, according to the embodiment depicted, provided by the tops of left- and right-side frames 16 and 18. A left lower pivot support 26 and right lower pivot support 28 (only partially shown in FIG. 1) are rigidly attached to and extend below side frames 16 and 18, respectively. As depicted, a first set of rear wheels 30 are mounted along a first rear axle 32, with an additional set of wheels 34 mounted along an additional axle 36. These axles are preferably mounted through a rigidified suspension 35, which uniquely includes horizontal rails 37,39 with angled brakes, so that the suspension is supported both from the sides with cross beams 82 and 84 and from the back of frame 12 at cross beam 86. While the number of wheels depicted includes four wheels on each of two axles 32 and 36, it will be understood that this is consistent with standard eighteen-wheel tractor and semitrailer rig construction. The number of axles or the number of wheels on a vehicle 10 or on a semitrailer 13 may be varied according to the length of frame 12 and load carrying requirements. For example, a trailer or vehicle may have three rear axles or may have additional axles and wheels (not shown) attached to the frame ahead of the hopper to provide additional load-carrying capabilities. However, significant advantageous aspects of the location of the rear wheels with respect to hopper pivot points on the embodiment shown will be discussed more fully, below. In the embodiment shown, there is a trailer tongue 38, which may be supported at the front end of the trailer off of the ground with left and right legs or landing gear 40 and 41. The tongue 38 may also include a hitch or "fifth wheel" 42 by which the trailer is attached to a truck 11.

The hopper 14 is positioned in opening 20 between the left- and right-hand frame members 16 and 18. The frame members 16 and 18 provide support surfaces 22 and 24 against which front and rear left hopper support arms 44 and 45 on the left and front and rear right hopper support arms 46 and 47 (not shown in FIG. 1) on the right. Support arms 44, 45, 46 and 47 are advantageously positioned spaced-apart toward each corner of the hopper so that a stable transport is achieved. Further advantageously, layers of shock absorbing material 48 may be interposed between support arms 44 and 45 and support surface 22 and also between support arms 46 and 47 and support surface 24 on the other side, such as sheets of hard rubber. Also attached between the frame 12 and the hopper 14 are lifting devices 50 and 52 and, preferably, concurrently actuatable hydraulic cylinders 50 on the left and 52 on the right (52 not shown in FIG.1—See FIG. 3). The hydraulic cylinders 50 and 52 are advantageously attached to the left frame 16 at a left partially rotatable attachment 56 and at a right partially rotatable attachment 58 (again, not shown in FIG.1—see FIG. 3). The left and right partially rotatable attachments 56 and 58 may advantageously comprise clevis and pin or pin and eyelet arrangements 56 on the left and 58 on the right. Similarly, left cylinder 50 and right cylinder 52 are attached to the hopper at left partially rotatable hopper attachment 60 and right partially rotatable hopper attachment 62, which may also be clevis and pin or pin and eyelet arrangements to allow each cylinder to partially rotate at either end about an axis which is parallel to the hopper pivot axis formed by an imaginary line between left pivot element 64 and right pivot element 66, which are attached to the frame 12 through left lower pivot support 26 and right lower pivot support 28.

The left and right lower pivot supports 26 and 28, respectively, may, according to one embodiment, attach sockets into which hopper-mounted pivot bars may be inserted (not shown). However, in a preferred embodiment, left and right pivot supports 26 and 28, respectively, mount lower pivot bars 64 and 66, projecting horizontally inward from the respective pivot supports. Corresponding lower pivot sockets 25 and 27 are secured to the hopper 14 for rotatably engaging the lower pivot bars 64 and 66. The lower pivot sockets are attached to lower pivot legs 29 and 31, which are rigidly affixed to the hopper 14.

In operation, the hydraulic cylinders 50 and 52 are actuated simultaneously in parallel to lower pivot elements 64 and 66, mounted on the hopper 14 about pivot supports 26 and 28 until upper pivot elements 72 and 74 mounted on supports 68 on the left and 70 on the right become engaged with corresponding hopper upper pivot elements 71 and 73 at the rear upper edge 76 of hopper 14. As the hydraulic cylinders 50 and 52 are actuated further in extension, the pivot axis is transferred from the lower pivot to the upper pivot elements 72 and 74. In the preferred embodiment, the lower pivot bars 64 and 66 become disengaged from lower hopper pivot sockets 25 and 27. Materials carried within the hopper 14 are then poured out of the hopper by the force of gravity over rear edge 76 and are further guided with rear chute 78 over the end 88 of trailer 13 and out beyond and, preferably, downward at an angle out beyond the rearmost set of wheels 34. This operation will be explained more fully, below; however, it should be noted that the position of left upper pivot support 68 and right upper pivot support 70 are advantageously positioned ahead of the rearmost set of wheels 34, with the rear chute 78 advantageously directing the materials being dumped beyond the rearmost wheels 34. This positioning avoids the rearmost axle 36 acting as a fulcrum about which the trailer 13 pivots because of the weight of the hopper and payload. Where the upper pivot axis is behind the rearmost axle, the weight of the pivoting hopper might tend to lift the front of the trailer. Instead, with the advantageous construction disclosed here, the weight is borne by the wheels and axles without causing the trailer to tip.

Figure 2:
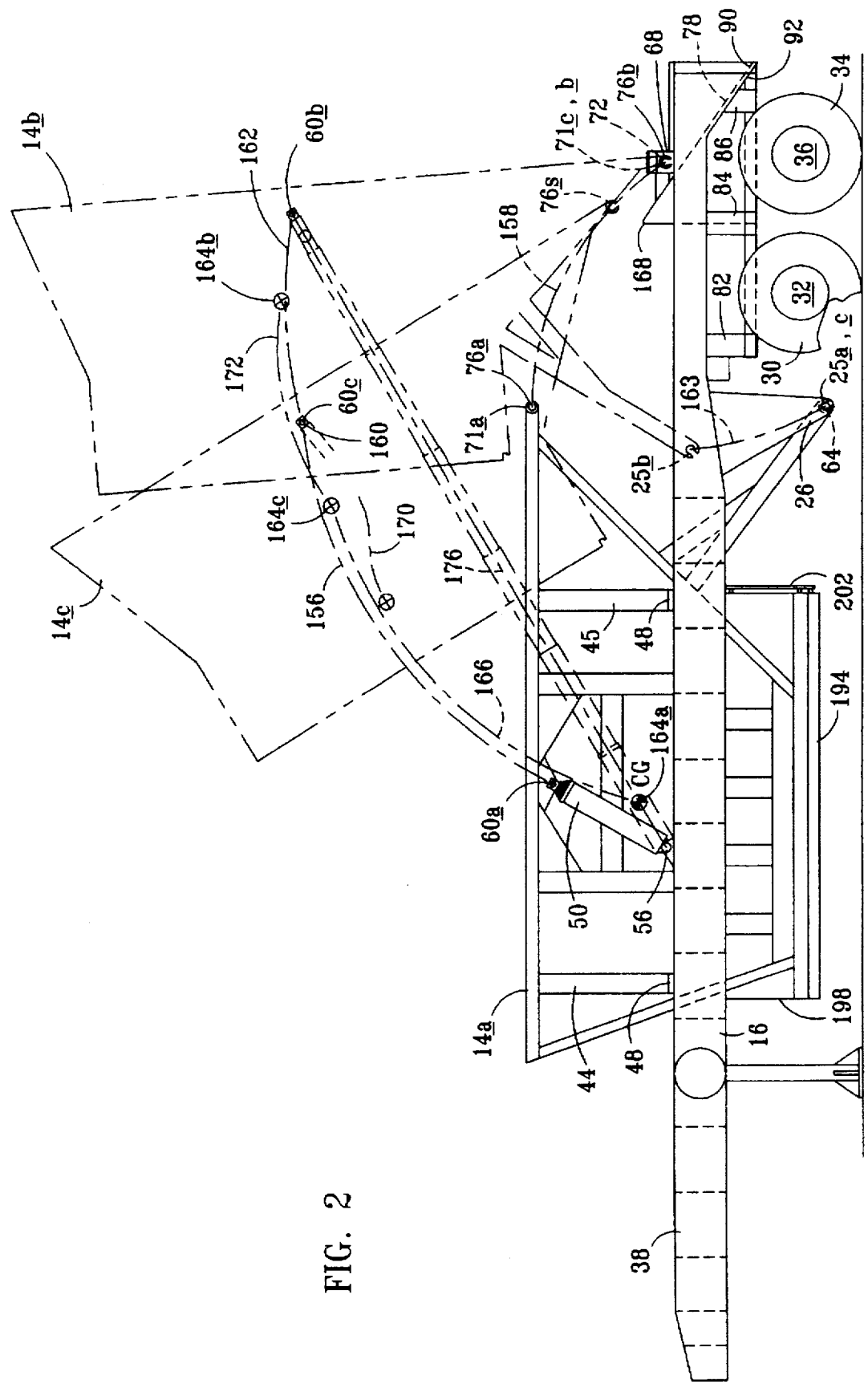
FIG. 2 is a side view of an improved dual use bottom and end dumping trailer shown with a hopper in its transport position and showing (in phantom) the hopper pivoted upward into an end dumping position according to the present invention.

FIG. 2 is a schematic side plan view of an improved dual use belly- and end-dumping trailer, shown in solid lines, with its hopper in a horizontal transport position and showing in phantom lines the hopper pivoted upward into an end-dumping position. In this schematic embodiment, the designation of a given element in its horizontal or transport hopper position is designated with the number of the element number and the letter "a", the hopper pivot transition position of a given element is designated with the element number and the letter "c", and the hopper pivoted upward position of an element is designated with the element number and the letter "b". In this schematic depiction, it will be observed that initially, hopper 14 is in a horizontal position, with socket 25a on the hopper assembly pivotably engaged with lower pivot bar 64 on the left side. It will be understood, with reference to FIGS. 2, 3 and 7, that hopper socket 27 will be similarly pivotably engaged with pivot bar 66 on the right side. As cylinders 50 and 52 are actuated, hopper rotatable connection point 60 moves in an arc, depicted at 156, from position at 60a to position at 60c, with the center of arc 156 at the axis of bars 64 and 66. Upper hopper connection socket 71 moves in an arc 158, which also has as its center the axis of lower pivot rods 64 and 66. Upper socket at 71a is positioned, relative to socket 25a, a distance which is equal to the distance between lower pivot bar 64 and upper pivot bar 72. Thus, as 71 traverses the arcuate path 158, from 71a to 71c and 71b, it will engage with upper pivot bar 72 after a predetermined amount of rotation. In the embodiment shown, approximately a 50° rotation occurs before 71 engages with bar 72, and it remains engaged until fully pivoted, as depicted in phantom lines at 71b. At this point in time, hopper to cylinder connection 60 will have moved to an imaginary transition point 60c along actuate path 156. Upper pivot bars 72 and 74 (74 not shown in FIG. 2—see FIG. 3) form a new upper pivot axis, and lower pivot socket 25, at the transition position 25c, begins to disengage from pivot bar 64. Similarly, left lower pivot socket 27, at the transitional position 25c, begins disengaging from pivot bar 66. As the cylinder 50 continues to be actuated in extension, the hopper connections 60 and 62 move in an imaginary arcuate path 162 about the center of the axis between upper pivot bars 72 and 74. Lower hopper socket 25 moves in an arcuate path 163 to the fully tilted position 25b, the arcuate path 163 has as its center, the axis between upper pivot bars 72 and 74.

It has been found that during this operation of the improved rear-dumping vehicle, materials within hopper 14 will, at a certain point, begin to spill over its rear edge 76. Also, it has been found that with a fully loaded hopper 14, the center of gravity will be approximately midway between the upper edge and the belly and approximately midway from the front wall to the rear wall, such as at the imaginary circle designated 164a in the initial horizontal transport position. The center of gravity 164a will initially move along an arcuate path 166, having as its center point the center axis between bars 64 and 66. This path 166 of the center of gravity will continue to be arcuate until the pivoting is sufficient steep that the contents begin to shift within hopper 14. In the case of a liquid, this would begin almost immediately so that the liquid would remain level at the top. However, in the case of solid, granular material, such as sand, gravel, grain or other similar solid, granular material, a certain amount of resistance to movement will prevent immediate shifting. Thus, it has been found that for construction materials, such as sand and gravel, shifting of the center of gravity and movement of the contents will begin between about 20° and 40° of pivoting. With a normally loaded hopper, the contents can begin to spill over the edge 76 after about 40° of pivotable rotation. Thus, the rear-angled chute 78 advantageously extends to a front edge 168, forward of the upper pivot bars 72 and 74, and, preferably, the angled chute 78 extends forward of a point 76s along the arcuate path 158, which corresponds to the initial spillage of the type of material to be carried in the hopper, so that any initially spilled material lands on the front edge 168 of angled chute 78. Thus, the chute 78 guides poured materials, even in situations where the flow begins before engagement of upper socket pivots 71 and 73, with upper pivot bars 72 and 74.

Also, because the center of gravity typically begins shifting, with shifting of the contents of hopper 14 even before the hydraulic cylinder reaches transition point 60c, the center of gravity 164 follows an imaginary path approximately as depicted at 170. It is noted that if the center of gravity did not shift, it would follow the imaginary path as depicted at 172. Thus, the positioning of hydraulic cylinder 50 at partially rotatable connections 56 and 60 (and positioning of hydraulic cylinder 52 at 58 and 62) is carefully selected to provide a sufficiently long lever arm for the force of the cylinders to overcome the weight of the hopper acting through the horizontal leverage distance from the center of gravity 164 to the pivot point 64. Because the center of gravity 164 moves toward the pivot point along path 166, the leverage distance of the center of gravity 164 continuously decreases. With cylinders 50 advantageously positioned at 90° to the leverage distance from 64 to 60a, the cylinders' leverage does not decrease until after reaching transition point 60c along path 156, when the cylinder leverage is approximately the distance from 72 to 60c. This transition point is near or beyond the pivot point 64, measured horizontally, so that the center of gravity 164 moves to within a short horizontal distance of pivot point 64. The moment arm for the weight of the hopper is relatively small. At that point, the hopper 14 is being moved substantially horizontally, as determined by a tangent to arc 166 at point 164c, which corresponds to the center of gravity at the transition point 71c where socket 71 engages pivot point 72 and the pivoting then begins to be about pivot point 72. At this point, the leverage of the hopper's center of gravity is determined by horizontal distance from point 164c to pivot point 72, which is, in the preferred embodiment, less than the effective leverage distance for the cylinder, as determined by the distance from pivot point 72 and transition point 60c for the upper rotatable attachment of cylinder 50 to the hopper 14. Transition point 60c is reached at the moment that the socket 71 engages with upper pivot bar 72. Of course, as the carried payload material begins to shift within the hopper, and especially if a portion of it begins to spill, the center of gravity tends to move horizontally toward pivot point 72 quite rapidly. Thus, the total, fully extended stroke of cylinder 50—and, therefore, the number of stages required for cylinder 50—can be minimized by positioning cylinder 50 and also corresponding cylinder 52 at the sides of the hopper. Preferably, in their extended condition, cylinder 50 and cylinder 52 are attached so that the line between connection points 56 and 62 is at an angle of about 90°, as measured from a line drawn between connection point 56 and pivot point 64. This maximizes the leverage when pivoting of the hopper is initiated and the angle decreases only slightly as the hopper rotates along path 156 until transition point 160 is reached, at which point the angle between the cylinder axis 176 and rotatable connection point 60c and upper pivot point 72 is again about 90°, thereby maximizing the advantage of the cylinder 50 when it begins rotating the hopper about rotation point 72. Thus, a preferred balance between the length of cylinder 50, the number of stages and the lifting force required in cylinder 50 is advantageously achieved by positioning connection point 56 at a point which is a short horizontal distance forward of the hopper center of gravity 164. More than five stages could be used, but five or fewer stages are preferred. The rotatable connection point 60 will be at a point substantially even with, or a short horizontal distance behind the center of gravity 164.

Figure 3:
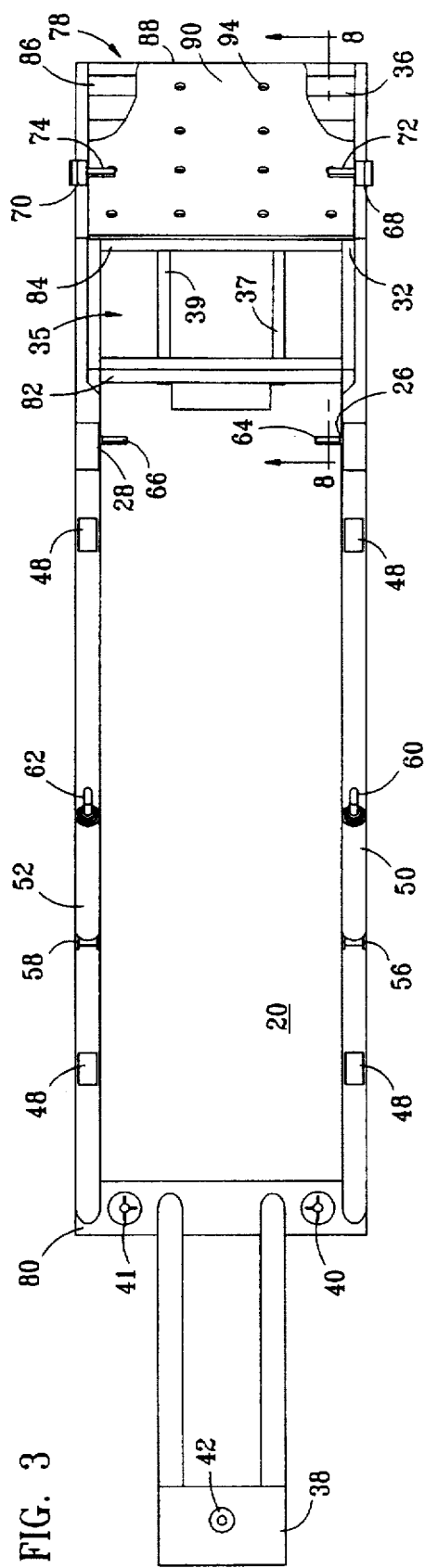
FIG. 3 is a top plan view of an open box trailer frame construction of the vehicle of FIG. 1, having the hopper removed.

FIG. 3 is a top plan view of the vehicle frame 12 (in this particular case, frame 12 of trailer 13). The construction of frame 12 with front cross beam 76 and rear cross beam 82 is depicted in FIG. 3, so that the opened area 20 is more fully understood. Additional rear cross beams 84 and 86 also advantageously hold the rear of the frame together and provide support for axles 32 and 36. An end beam 86 provides strength to the rear edge 88 of chute 78. Chute 78 may be advantageously provided with a smooth, low-friction surface 90, which may, in a preferred embodiment, comprise a plastic sheet cover 90, which is attached to a structural rear chute support 92, which may be an angled plate of steel attached to the frame 12. Attachment fasteners 94 secure the plastic sheet cover 90 to chute support 92. The attachment fasteners 94 may be large, flathead screws or bolts which securely hold the plastic sheet cover 90 in a relatively flat and secure position to form a sliding surface at the bottom of an angled chute 78, as described above. The attachment fasteners 94 are, preferably, removable to allow the rear chute cover 90 to be removed and replaced as abrasion and wear occurs. The underlying support plate 92 will remain intact, without degradation. In a preferred embodiment, sides of chute 92 and also the interior surfaces of hopper 14 may also be covered with an abrasion-resistant, reduced friction plastic material. Particularly, the rear hopper wall 190 might be advantageously covered with such a plastic sheet material. Such a plastic covering, which is also heat-resistant, is particularly advantageous in situations where hot asphalt or other hot, sticky composite or aggregate materials may be used.

Figure 4:
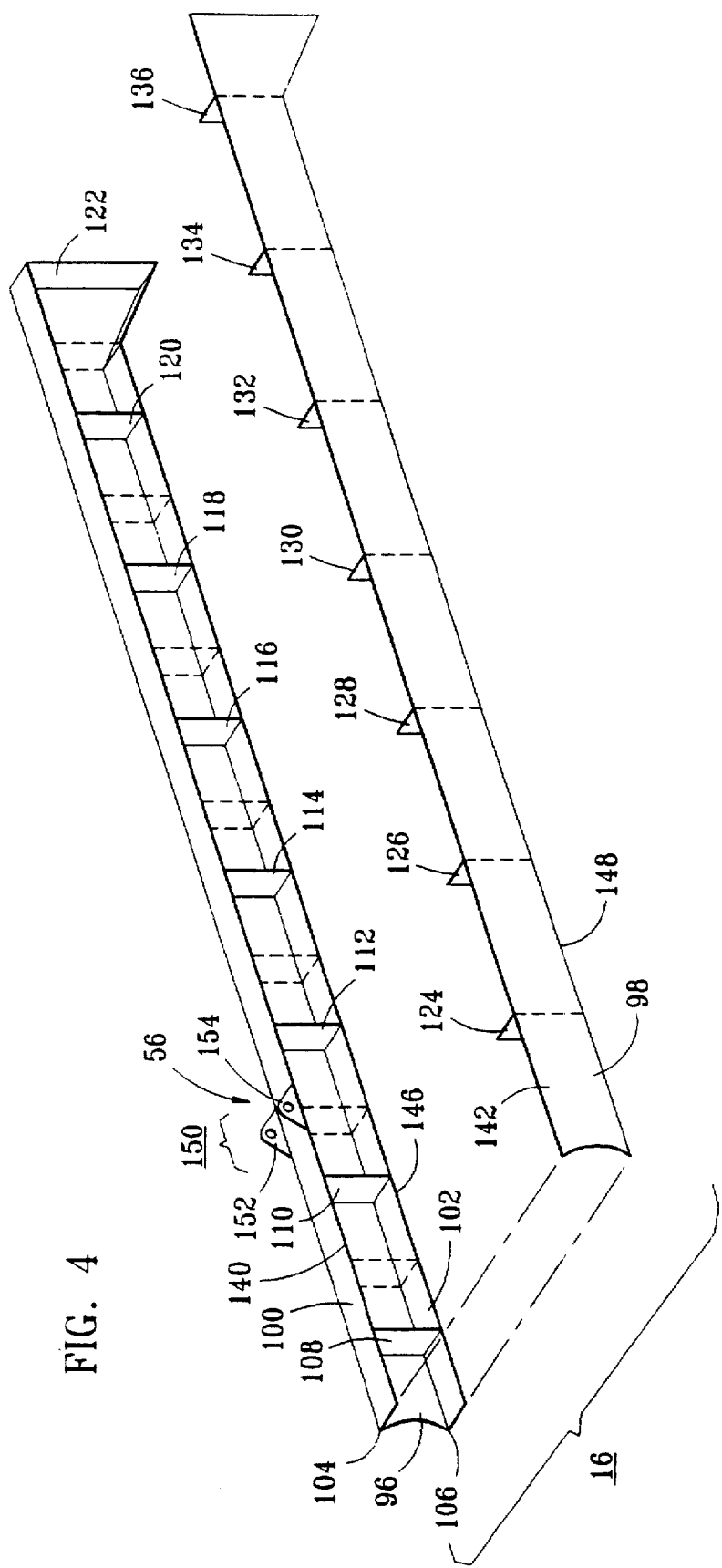
FIG. 4 is a schematic partial assembly view of one side support member of the trailer frame, uniquely constructed for withstanding significant forces required for pivoting a filled hopper into an end dumping position according to the present invention.

In the preferred embodiment, the frame members 16 and 18 are advantageously constructed as box beams having top plates, bottom plates and side plates. The details of construction of the box beams, according to the present invention, will be more fully understood with reference to FIG. 4, which is a schematic perspective view of a preferred embodiment of the left box beam 16. It will be understood that similar construction is preferred for a right box beam 18. In the embodiment depicted in FIG. 4, the box beam may advantageously be constructed of a first side plate 96 and a second side plate 98, having a top plate 100 and a bottom plate 102. In the preferred embodiment, the top plate 100 is welded to the first side beam 96 at a 90° angle with respect to plate 96. Although the structure can be welded with the side plates in the vertical position, as shown, a fixture can also be advantageously used in which top plate 100 and side plate 96 are each angled at approximately 45° with respect to vertical during welding (not shown). A continuous bead of weld is made along the length of the beam at corner 104. The 45° angle of each plate causes the weld to advantageously flow, by the force of gravity, relatively evenly into both top plate 100 and side plate 96. Similarly, bottom plate 102 is also welded at a 90° angle to first side plate 96, and both are held, for welding purposes, angled at approximately 45° from vertical (not shown), so that the weld along corner 106 flows relatively evenly by the force of gravity into both side plate 96 and bottom plate 102. It is desirable to have spaced-apart support struts on the interior of the constructed box beam 16. It has been found to be further advantageous to have a plurality of support struts 108, 110, 112, 114, 116, 118 and 120 within plate 122, each rigidly welded to side plate 96 and also to the inside of top plate 100 and the inside of bottom plate 102. Alternatingly interposed with the support struts securely welded to side plate 96 is another plurality of support struts 124, 126, 128, 130, 134 and 136, each securely welded vertically to side plate 98, preferably at spaced-apart regular intervals for interdigitated insertion between the support struts, which are welded to first side 96. Second side plate 98 is positioned adjacent to first side 96, with the support struts interdigitatedly interposed, and the entire assembly is desirably held in a fixture so that top plate 100 and second side plate 98 are angularly disposed at 45° from vertical, and a weld is applied all of the way along the junction of edge 140 on top plate 100 and edge 142 on second side plate 98. The entire assembly is then rotated approximately 90°, so that side plate 98 and bottom plate 102 are also positioned each at 45° from vertical, and a weld is applied therealong between edge 146 of bottom plate 102 and edge 148 of second side plate 98. The right side frame 18 is similarly advantageously constructed as a box beam 18 in a fashion substantially the same as with box beam 16, shown in FIG. 4. Both box beams 16 and 18 are then attached by welding to a front cross beam 80 and to rear cross beam 82 to additional rear cross beam 84 and to end beam 86 to form the main body of the frame. The tongue 38 is attached, as by welding, to the front cross beam 80, and other attachments, such as pivot supports and rear axle suspension, can be attached by welding or bolting to form a frame assembly.

The left, partially rotatable attachment 56, at which left hydraulic cylinder 50 will be attached to the top 100 of box beam 16, may, preferably, be formed by welding parallel, spaced-apart clevis brackets 152 and 154 to top plate 100.

According to the described construction of box beams, the side plates 96 and 98 and top plates 100 and 102 act together to provide structural strength against bending caused by force applied by cylinder 50 through attachment 56. Vertical struts 108, 110, 112, 114, 116, 118, 120 and 122 act to rigidify side plate 96, as well as top plates 100 and 102, against buckling. Similarly, vertical support struts 124, 126, 128, 130, 132, 134 and 136 are directly welded to side plate 98 to prevent side plate 98 from buckling. Also, the close spatial relationship with the vertical struts, even where they are not welded directly to more than one plate, acts to prevent the side plates and the top and bottom plates from buckling inward. Thus, by uniquely interdigitating the support struts, all of the exterior plates of the box beams are rigidified against buckling. With this construction, one box beam on either side of the frame adequately and advantageously provides strength sufficient for carrying a fully loaded hopper, and further for lifting the hopper in a pivoted fashion using side-mounted cylinders.

FIG. 5 is a side plan view of the hopper 14, according to one embodiment of the present invention. FIG. 6 is a front-end view of the hopper 14 of FIG. 5, and FIG. 7 is the rear-end view of the hopper 14 of FIG. 5. Hopper 14 is constructed with a top opening 20, defined by a rear edge 76, side edges 178 and 180 and front edge 182. Side walls 184 and 186, front wall 188 and rear wall 190 all angle inwardly toward a belly opening area 192. The back wall 190 is, preferably, at an angle of about 45° so that it forms an end-dumping chute for the hopper 14, which need not be pivoted very far beyond 90°, total pivoting, in order to provide an adequate discharge angle of about 45° for chute 190 when used in the end-dumping mode. When the hopper 14 is used in the belly-dumping mode, the 45° angle of the rear wall 190 is also adequately steep. The other walls 184, 186 and 188 are all at a substantially steeper angles than 45°, so that belly dumping is facilitated and sufficient carrying capacity is maintained.

The belly-dumping discharge area 192 is blocked with doors 194 and 196. These doors are constructed to be actuated to be opened or closed positions with left and right actuator arms 198 and 200 in the front and left and right actuator arms 202 and 204 in the rear. The actuator arms are actuated simultaneously using front cylinder 206 and rear cylinder 208, respectively. Arm 198 is pivoted at 210, arm 200 is pivoted at 212, arm 202 is pivoted at 214 and arm 204 is pivoted at 216. Each arm is securely affixed to one of the belly doors, so that arms 200 and 204 are affixed to belly door 196 and arms 198 and 202 are affixed to belly door 194. Further, advantageously, an adjustment mechanism or a timing mechanism, 218 at the front and 220 at the rear, are arranged to cause both doors 194 and 196 to be opened the same amount in each direction and/or to be closed the same amount in each direction, depending upon the actuation of cylinders 206 and 208. Cylinders 206 and 208 desirably act simultaneously in concert with each other, so that the front opening and the rear opening are consistently maintained. The doors are also uniquely constructed in an arc shape so that they may be smoothly opened about pivot points 210 and 214 with respect to door 194 and about an axis formed by pivot points 212 and 216 with respect to door 196. The arcuate shape of the doors corresponds to the double arcuate shape formed in front end plate 222 and rear end plate 224, so that the hopper 14 is maintained in a substantially closed condition without gaps being formed at either end. Because of the arc shape, the doors may still be moved to an opened position with a smooth pivoting rotation of each door and arm with respect to its respective pivot axes. The doors 194 and 196 are also uniquely constructed with a rigidifying, bracing structure, schematically depicted at 226 and 228 in FIG. 6. This rigidifying structure allows the doors to extend along the entire length of the hopper belly while carrying a heavy load over long distances and often over rough roads and terrain typical of construction sites where loading and dumping may be required.

It will also be observed that, advantageously, the pivot positions formed by pivots 210 and 214 and pivots 212 and 216 are positioned inward from the hopper side walls 184 and 186. Preferably, the pivots are inward a sufficient distance to be more than halfway toward the center from each respective side wall 184 and 186. Thus, the center of gravity of the mass of the load carried by each of the doors acts downward with a small horizontal lever arm to pivot each door inward. This holds doors 194 and 196 inward with respect to each other, when loaded, due to the weight of the mass being carried. In this fashion, relatively small hydraulic cylinders 206 and 208 may be advantageously used to slowly open the doors, thereby emptying a metered amount of material. This has been found to be preferable in many cases, over dumping an entire load instantaneously, as previously achieved with pneumatically actuated cylinders, which were typically actuated either fully closed or fully opened. Further, this provides an additional safety feature so that, when loaded, the doors hold themselves closed and force must be applied in order to open the doors.

Figure 8:
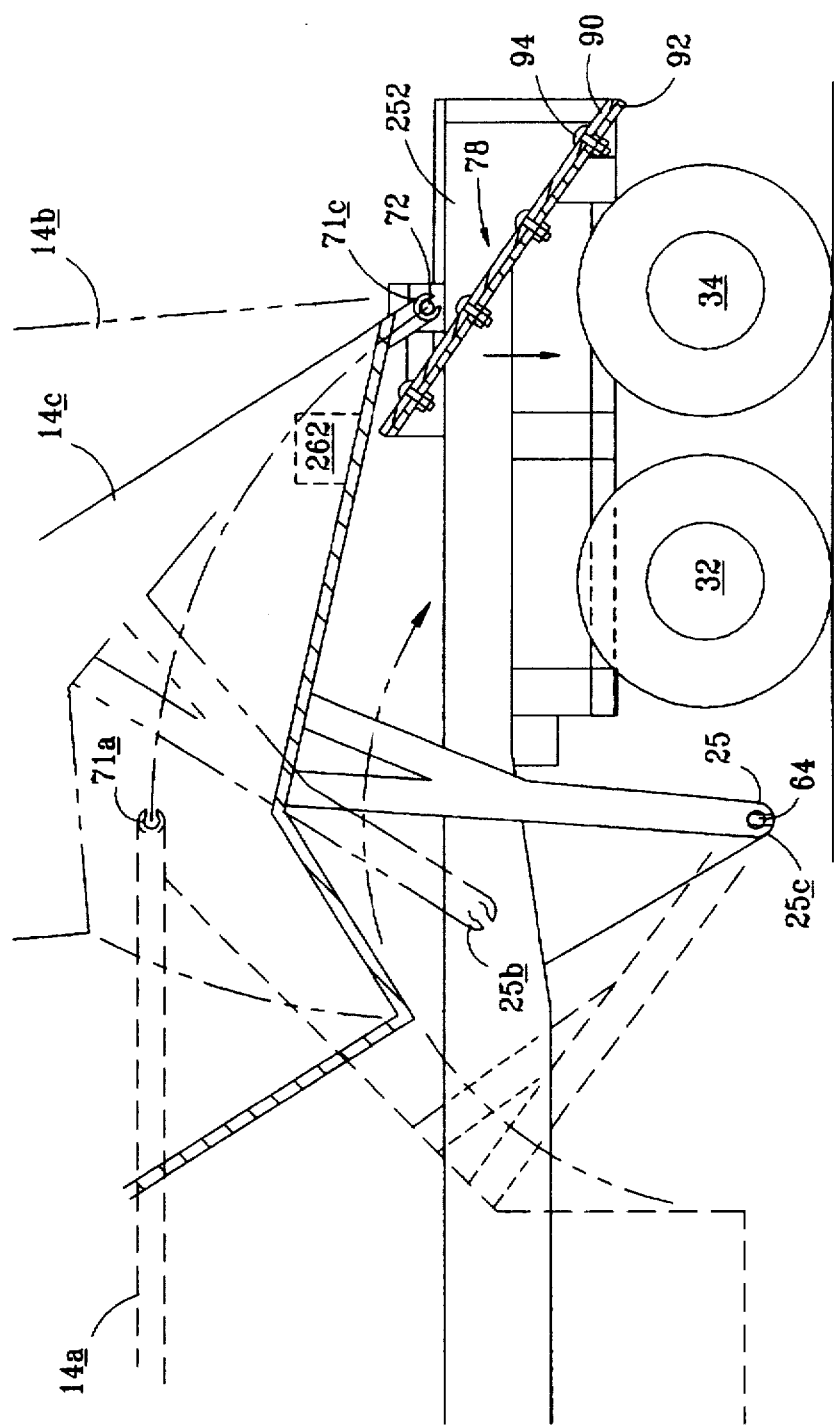
FIG. 8 is a schematic, partial detail, side cross-sectional view of the inventive dual use bottom and end dumping trailer according to the present invention, with the section line positioned as depicted at section 8—8 of FIG. 3, and further schematically depicting dual pivot point operation of the inventive trailer for end dumping from the hopper.

Referring now to FIG. 8, which is a partial cross-sectional view of the dumping trailer of FIG. 2, additional details of construction will be more fully understood. In FIG. 8, the initial horizontal transport position of the hopper 14 is depicted in phantom lines, with the hopper 14 depicted in solid cross-section at the transition point, and further depicted in full dumping position in phantom lines. Thus, three significant positions are thus schematically depicted. It will be noted that the cross-section shown is through the lower left pivot bar 64 and upper left pivot bar 72. Lower hopper socket 25 is shown in solid lines at transition point 25c, and upper hopper socket 71 is shown in solid lines at pivot transition position 71c. In this position, the lower pivot bar 64, in combination with socket 25, are designed to begin disengaging, and similarly, upper socket 71 is designed to initiate engagement with bar 72. The construction of the angled chute 78 with the preferred plastic low-friction lining 90, securely attached to base plate 92 using fasteners 94 is also depicted.

Figure 9:
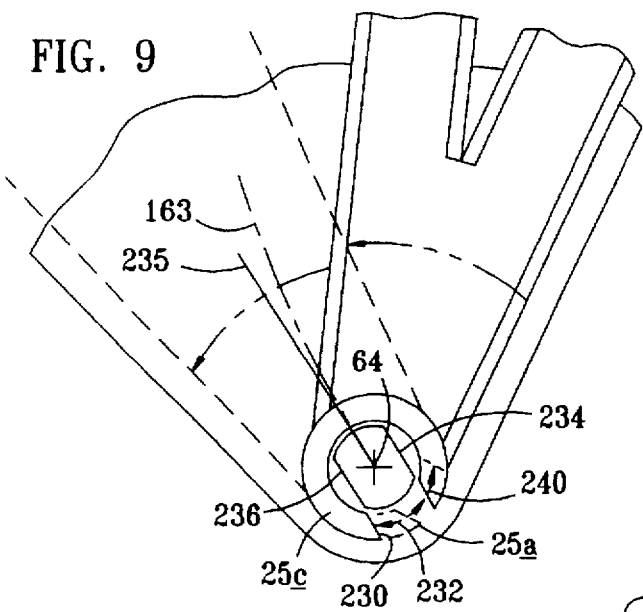
FIG. 9 is a schematic, enlarged, side view of a lower pivot pin mounted to the frame and uniquely constructed for disengageable pivoting with a lower pivot split collar socket mounted on the hopper.

With reference to FIG. 9, which is a detailed, partial view of lower pivot bar 64 and hopper pivot socket 25 (again, shown at the transition point with solid lines), the advantageous construction of a preferred embodiment can be more fully understood. Advantageously, pivot socket 75 has an opening 230 along an arc 232 which is less than 180° out of a circle. Also, pivot bar 64 has surfaces 234 and 236, across which the dimensions of the bar are reduced. Preferably, surfaces 234 and 236 are parallel, flat surfaces, formed at an angle, corresponding substantially to a tangent 235 to an arc 163 formed with bar 72 as the center point. This tangent 235 to the arc 163, drawn from 72 as a center point, also substantially bisects the opening 230 so that upon engagement of socket 71 with upper pivot bar 72, socket 25 can move in an arcuate path 163 relative to bar 64, and bar 64 moves relatively outward through opening 230 without obstruction. The opening 230 is, preferably, less than 180°, and, preferably, corresponds in size to the reduced dimension of the bar 64, measured across its flat surfaces 234 and 236. Thus, when lower hopper socket 25 engages with bar 64 and is rotated as indicated at 240 relative to the bar 64, socket 25 becomes securely engaged with bar 64, and movement of the hopper with respect to the bar is resisted and disengagement will not occur. Particularly with up and down motion, as might be expected due to bumping during transport, the socket 25 remains continuously engaged with and cannot escape from bar 64 unless it is both rotated so that flats 234 and 236 are aligned with opening 230 and then pivoted or moved angularly substantially parallel to the flats 234 and 236 in order to achieve disengagement. Thus, transitional pivoting is facilitated while disengagement during transport is advantageously prevented.

Figure 10:
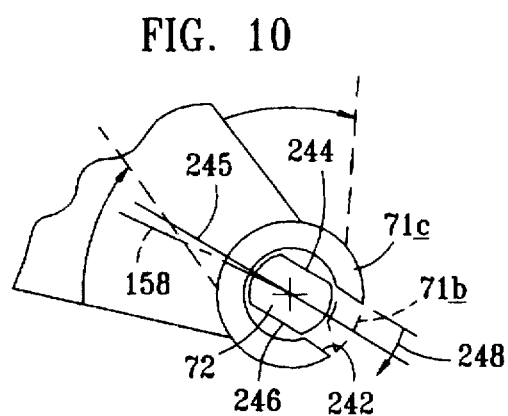
FIG. 10 is a schematic, side depiction of an upper pivot shaft mounted on the frame for secure pivotable engagement and disengagement with an upper split collar socket mounted on the hopper.

Referring to FIG. 10, a similar arrangement with socket 71, being designed to have an opening 242, which spans an arc of a cross-sectional circle around the socket 71 which is less than 180°. Reduced dimension surfaces 244 and 246, preferably, flat surfaces for ease of manufacturing are formed on bar 72, which flats 244 and 246 are desirably parallel to a tangent 245 to an arc 158 formed by socket 71 when the hopper 14 is pivoted about lower pivot bar 64. Thus, after a small amount of pivoting, schematically depicted at arrow 248, beyond the initial transitional pivot engagement point, socket 71 is held in pivotable engagement with bar 72, so that while the hopper is in an upward discharge position, disengagement with the upper pivot junctions is not permitted.

Figure 11:
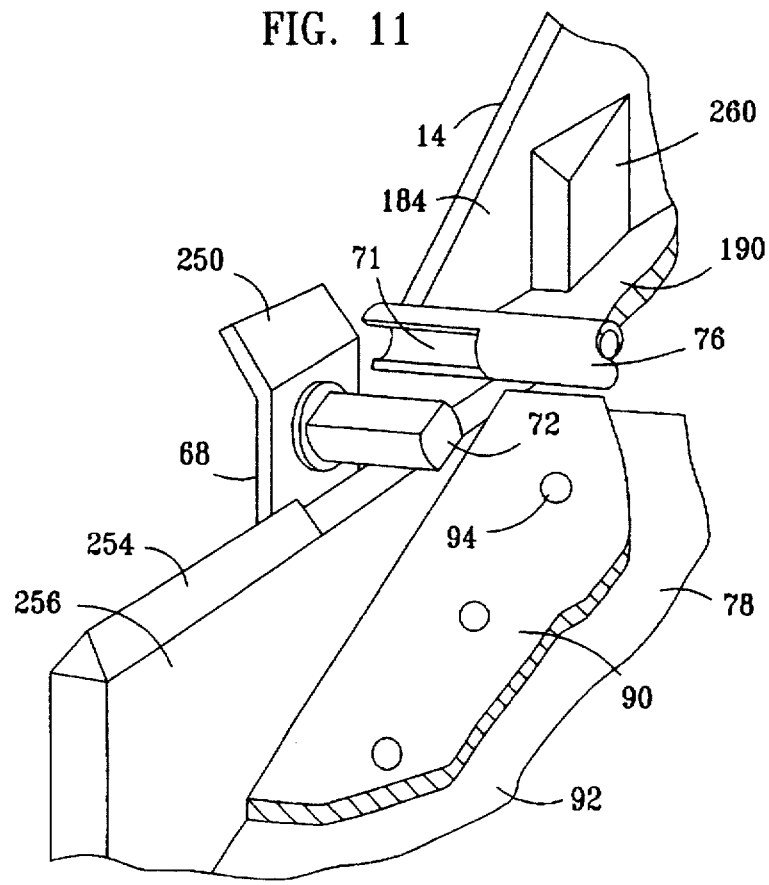
FIG. 11 is a partial, perspective view of one of the upper pivot shafts and corresponding upper pivot collar on the hopper, further depicting a guide baffle in the hopper, an upper pivot mount and guide block on the frame, and also depicting a portion of the rear-angled chute according to a preferred embodiment of the present invention.

Other advantageous features may be more fully understood with respect to FIG. 11, which is a partial, enlarged perspective view of upper pivot bar 72, upper pivot socket 71, shown attached above the angled chute 78, and also showing the support structure 68 for holding pivot bar 72. Further, a left material deflector 260 is shown in hopper 14 for facilitating smooth discharge of materials, particularly sticky materials, such as hot asphalt, from the hopper and down chute 78 without bunching. A corresponding right deflector 262 (shown in FIG. 8) is provided on the inside of the other side of the hopper 14. Support structure 68 advantageously has an upwardly extending, angled guide surface 250, by which any initial, small misalignment between hopper socket 71 with pivot bar 72 will be directed along the slope of angled guide 250 back into pivotable engagement. As the distance between pivot socket 71 and lower pivot socket 25 is substantially fixed, the key dimension of concern for avoiding misalignment has been found to be the side-to-side direction which is corrected by angle surface 250 on the left side, attached to support 68. Thus, if all of the manufacturing tolerances and/or wear at the pivot connections is directed to one side, as where the vehicle is on a side incline, the angled support guide surface 250 acts to move the socket 71 back to an engagement position. A similar right side angled guide surface (not shown) will also be attached to support 70 on the right side for guiding socket 73 into engagement with upper pivot bar 74.

The angled flat surfaces of pivot bars 64, 66, 72 and 74 all act to deflect any accumulation of debris. Also, in order to prevent accumulation of debris and material along the top surface 22 of beam 16, a tapered top surface 254 is provided along the rear chute wall 256.

Figure 12:
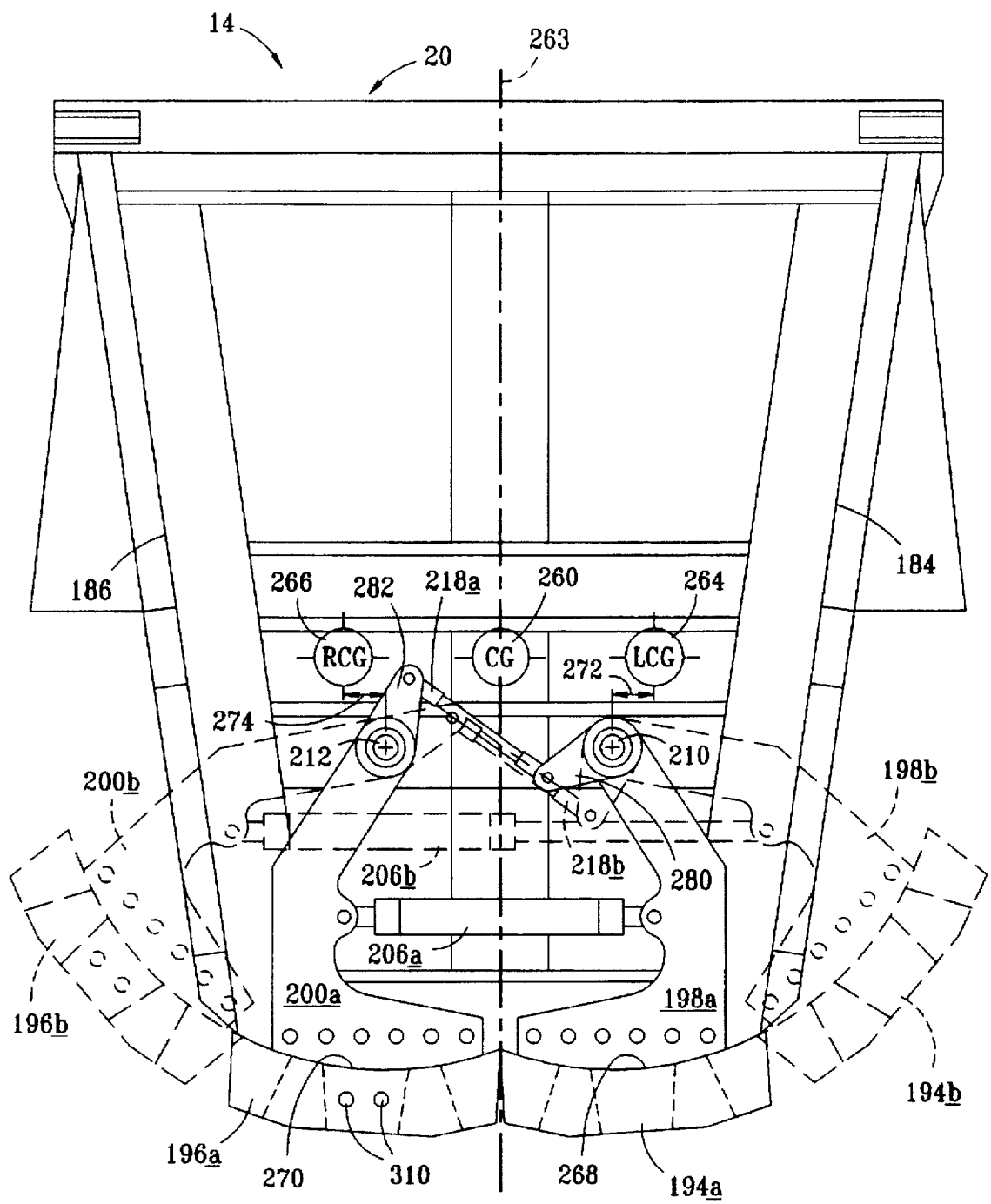
FIG. 12 is a front schematic plan view of a hopper, having the belly door assemblies attached thereto, depicting the belly doors in a closed position (shown in solid lines) and in a fully open position (shown in phantom lines)

FIG. 12 shows a schematic end elevation view of the hopper 14, having front actuator arms 198 and 200, shown in a closed position 198a and 200a, respectively, with the actuating cylinder 206a also in a retracted, closed position. In this position, the belly bay doors 194a and 196a are also in the closed position. Shown in phantom lines are the belly bay doors 194b and 196b in an open position. The belly bay doors are actuated with actuating cylinder 206b to an extended position, thereby actuating arms 198b and 200b to an outwardly pivoted position. The arms 198 and 200 pivot about pivot points 210 and 212, respectively. In the embodiment depicted, the center of gravity of the material loaded into hopper opening 20 will be at 260, along center line 263. Center line 263 corresponds to a vertical plane about which the hopper and vehicle are essentially bilaterally symmetrical, except as noted primarily with respect to the timing mechanism 218, as will be discussed more fully below. With respect to the load carried by belly bay door 194a, the center of gravity of that portion of the material in hopper 14 will effectively be at the left center of gravity 264. The right hopper bay door 196a will support the material in hopper 14, which acts simply at the right center of gravity 266. (Again, "right" and "left" are relative to the vehicle, looking from the rear). Pivot point 210 is desirably spaced inward toward center line 263 from the left center of gravity 264. Similarly, pivot point 212 is positioned inward of the expected center of gravity 266 for the right-hand portion of the material in hopper 14. With this unique arrangement and positioning of pivot points 210 and 212, and further because of the arcuate shape of interior surfaces 268 and 270 of belly bay doors 194a and 196a, respectively (which arcuate shape allows the center of gravity 264 and 266 to act substantially vertically downward upon the belly bay doors with respect to the centers of rotation at pivot points 210 and 212), the doors are held by the force of the load into a closed position. In the preferred embodiment depicted, the effective moment arms 272 and 274, with respect to the pivot points 210 and 212, are approximately one-fifth of the distance from the center line 263 to a side wall 184 or 186. This moment arm depicted is relatively short, compared with the moment arm for the actuating cylinder 206. Thus, the amount of force from the load or the torque which is holding the doors closed can be overcome by a reasonably sized hydraulic cylinder 206, which acts through a significantly larger moment arm when moving the doors from a closed position toward an open position. The moment arm for the action of the cylinder decreases as the doors open, as cylinder 206b moves effectively closer to pivot points 210 and 212. However, as the material is being dumped, its volume, mass and weight within the hopper continuously decreases as the doors are opened. Also, as the doors 194 and 196 move increasingly toward the open position, the weight supported by each door decreases. Preferably, a hydraulic cylinder is selected so that the force of the cylinder, multiplied times its moment arm, is more than adequate to open the belly bay doors to any desired opening position.

The unique construction and positioning of the arms, the pivot points and the structure of the curvature of the doors permits partial opening of the belly bay doors so that partial dumping can be accomplished. It has been found that doors which are angled downwardly to an inverted apex at the center line 263 would not provide the same moment arms 272 and 274, as provided with the curved belly doors, as depicted. The curved belly doors approximate a horizontal surface, which is therefore acted upon by forces directed normal to, or perpendicular to the surface, because the behavior of granular material is similar to a fluid under pressure, which acts in a direction normal to the surface of the container in which the fluid is held. Horizontal belly bay doors, if used with properly positioned pivot points, would act in the manner as described to hold the doors in a closed position under the load; however, such horizontal flat doors would not function to pivot out of the way without binding at the lower edges of walls 184 and 186. Thus, by providing the unique combination of the curved doors which, having a radius substantially equal to the distance from the pivot points 210 and 212, and with the pivot points 210 and 212 spaced outwardly from the center line 263 less than halfway to the side walls 184 and 186, respectively, allows the belly bay doors to both be held in a closed position by the weight of the granular material in the hopper and also to be pivoted outwardly without binding at the lower edges. The lower front edge of front end wall 188 and the lower rear edge of rear end wall 190 are therefore provided with double-hump plates 222 and 224, corresponding in shape to the interior surfaces 268 and 270 of doors 194a and 196a when in a closed position.

In a further preferred configuration of the hopper doors, a "bias" is put on the radius of curvature of the doors to reduce binding of the load against the doors when they are pivoted to an open position. The radius of the curve of the doors is purposefully offset slightly so that each inner edge 320 and 322 is slightly below the radii 209 and 211, drawn from each arm pivot pin center 210 and 212, respectively. Thus, the curved surfaces 268 and 270 are below imaginary arcs 320 and 322, as would be drawn by radii 209 and 211, pivoted about arm pivot centers 210 and 212. This downward spacing, or offset, of the door in the middle of the hopper opening is necessarily small, because it tends to counteract the effect of the offset of each arm pivot pin from the center of each door, which holds the doors closed. For doors having radii of curvature of about 27 inches, and with the arm pivot points 210 and 212 only a few inches inward, compared with the position of the centers 269 and 271 of door surfaces 268 and 270, the downward offsets at 319 and 325 would measure about 1 inch, or less. The downward spacing, or offset, of the curved surface of the doors causes the doors to relieve themselves away from the load as they are opened; that is, the effect or the result is that each door pulls downward a fraction of an inch away from the loaded material as it opens. Without the "bias", the doors (if they are built to have exactly the same radius of curvature for surfaces 268 and 270 as the pivot radius) must drag past the loaded material, requiring more effort by the door's hydraulic cylinders. Conversely, if the radius is "biased" the wrong way, as if not made correctly, the doors will be much harder to open and the hydraulic pressures would need to be increased accordingly. In such an instance, insufficient clearance at the lower edge of the hopper opening could also cause binding between the curved surface of the doors and the lower edges of the hopper opening. If they are "biased" too much, the tendency to remain closed will be diminished or lost.

Further, advantageously, a timing mechanism 218 is uniquely constructed and attached so that both doors 194 and 196 open the same amount, but in opposite directions, in response to actuation of hydraulic cylinder 206.

Figure 13:
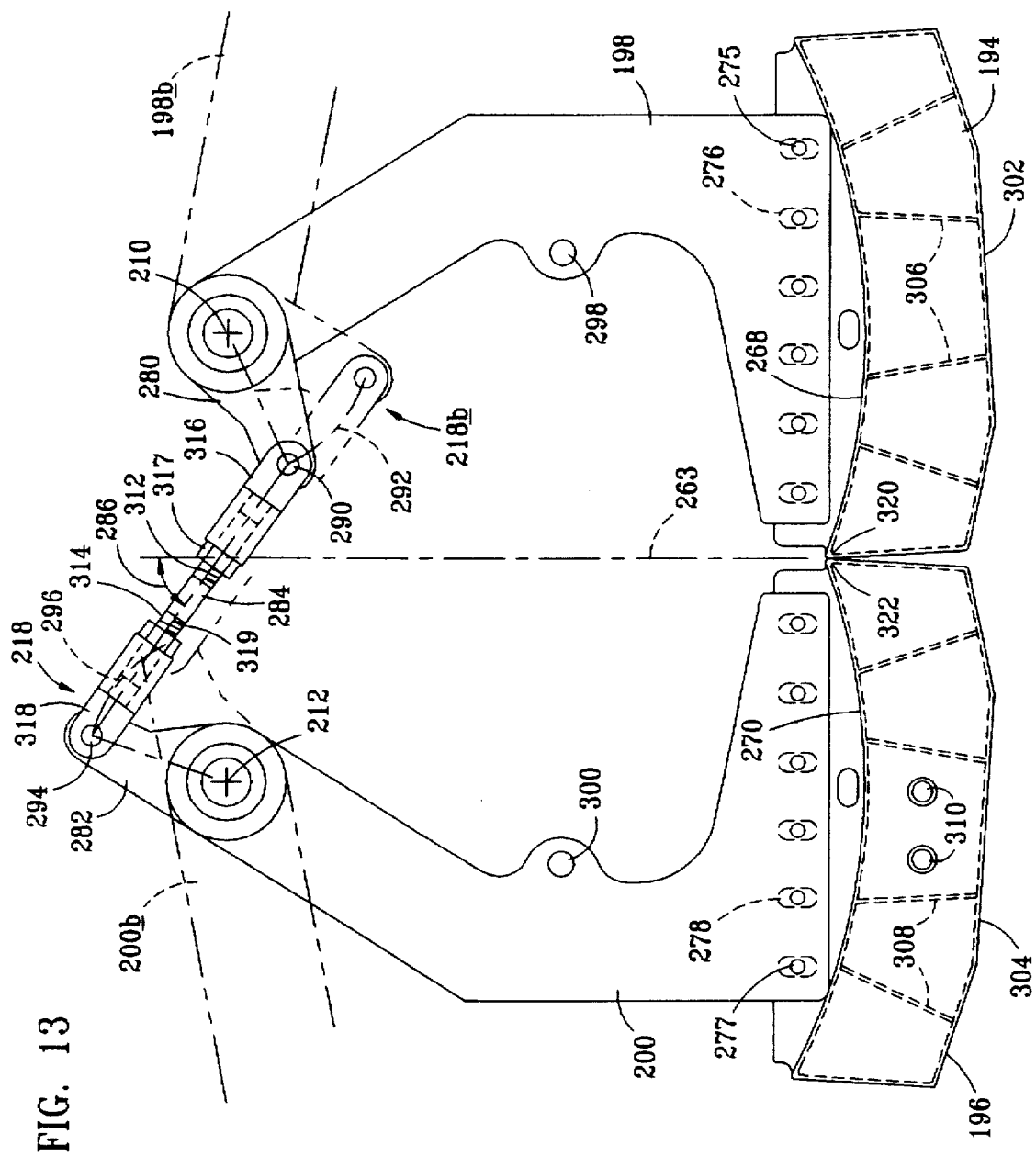
FIG. 13 is a schematic plan view depicting the hopper belly door arm assemblies with a timing mechanism and door closure adjustment mechanism, depicted in a closed position (shown in solid lines) and partially depicted in an open door position (shown in phantom lines)

The construction and operation of timing and adjustment mechanism 218 and all of the parts of which this mechanism is constructed can be more fully understood with reference to FIG. 13. FIG. 13 shows a large schematic view of a pair of actuator arms 198 and 200, attached to a corresponding pair of belly bay doors 194 and 196. The bay doors are bolted or otherwise secured to actuator arms 198 and 200 as at a series of mounting holes 275 and 277, respectively. The mounting holes 275 and 277 and/or corresponding mounting holes 276 and 278 in doors 194 and 196, respectively, may be elongated to allow adequate adjustment so that the doors appropriately meet along center line 263.

To further ensure appropriate simultaneous actuation of bay doors 194 and 196, the timing mechanism 218 is constructed and attached to the upper end of actuator arms 198 and 200. Control arms 280 and 282 are rigidly affixed to arms 198 and 200, respectively. These control arms are affixed for pivoting about pivot points 210 and 212, respectively, so that actuation of actuator arms 198 and 200 also pivots or rotates control arms 280 and 282. Control arm 280 is positioned at a specific angular relationship relative to actuator arm 198. The angle at which control arm 280 is attached with respect to actuator arm 198 and the angle at which control arm 282 is attached to actuator arm 200 are preferably selected with respect to each other so that connector rod 284 of timing mechanism 218 will be at substantially the same angular orientation 286 relative to the center line 263, both when bay doors 194 and 196 are in the closed position, as depicted in FIG. 13, and also when the bay doors 194 and 196 are in the open position corresponding to the rotated position of the actuator arms 198b and 200b, represented in phantom lines in FIG. 13. The length of arms 280 and 282 are also preferably equal so that connection pin 290, between arm 280 and connection bar 284, moves between a closed bay door position and an open bay door position through an arc 292. Similarly, connection pin 294, between arm 282 and connector bar 284, moves through an arc 296, which arc 296 is equal in length to arc 292 when the bay doors are moved between the open and closed positions a and b, respectively. Thus, the timing mechanism 218, with all of its parts as described above, acts to maintain control or "time" the opening or closing of actuator arms 198 and 200 the same amount and at the same rate, in opposite directions with respect to each other, when actuator cylinder 206 (not shown in FIG. 13), which connects at points 298 and 300, is expanded or contracted to move the actuator arms 198 and 200 between open and closed positions.

In one specific embodiment similar to that as depicted in FIG. 13, the radius from pivot points 210 to curved surface 268 of door 194 is approximately 34 inches, the bay opening, from one side to the other, is approximately 54 inches so that each door must move in an arc a distance of about 27 inches between a fully closed and fully open position. In this embodiment, each arm 198 and 200 is rotated through an angle measuring between about 40° and 45° to move the bay doors between fully open and fully closed positions. Similarly, the arcs 292 and 296, traversed by connector pins 290 and 294, also measure between about 40° and 45°. Arms 280 and 282 each have a length of about 9 inches. The angular position of pin 290, with respect to pivot point 210, at the closed door position moves in a counter-clockwise direction from a position at 200°, measured counter-clockwise from the vertical through pin 210, to a position at approximately 240°, measured in the same counter-clockwise direction. Pin 294 pivots about pivot point 212, from a position at about 20°, measured in a clockwise direction from the vertical, to a position at about 60°, measured in the same direction. For purposes of this invention, one important configuration is that pin 290 is below center and pin 294 is above center, so that they move in the same direction when the actuator arms move in opposite directions. In this configuration, connector rod 284 of timing device 218 is maintained in approximately the same angular orientation at the beginning and ending points of rotation between closed and open positions and the lengths of the control arms are the same, so that both actuator arms move the same amount and at the same rate. The length of arms 280 and 282, relative to the length of the actuator arms 198 and 200 and the opening distance, and also the spatial relationship between pivot points 210 and 212, will all affect the angle 286 and will determine the angular orientation of arms 280 and 282, relative to arms 198 and 200. However, with the angular orientation 286 of connector rod 284 maintained throughout the rotation, the movement of timing device 218 is substantially in a linear direction, with only small variations due to the arcs 292 and 296. This device keeps both actuator arms 198 and 200 opening substantially the amount in opposite directions with respect to each other.

Also depicted in FIG. 13, in hidden lines, is the reinforced construction of bay doors 194 and 196 in which the interior arcuate surfaces 268 and 270 are supported with exterior spaced-apart walls 302 and 304, between which interior surface 268 and exterior wall 302 rib or strut supports 306 extending along the length of the door are rigidly fastened, such as by welding, and preferably at slight angular relationships to form a substantially rigid door structure capable of withstanding a substantial amount of weight which may be applied along the entire bay opening. Similarly, a plurality of ribs 308 are welded to the exterior wall 304 and interior curved surface 270 to form a rigid, yet lightweight, door 196. Also depicted in FIG. 13 are opening holes 310 through which hydraulic pipelines are connected between actuating cylinders 206 and 208 at either end of the hopper assembly.

Also shown in FIG. 13 are the details of one embodiment of an adjuster mechanism of the adjustment portion of timing and adjustment mechanism 218. In this embodiment, connector rod 284 comprises a round rod, having threaded portions 312 and 314, onto which devises 316 and 318 are threadably connected. The devises 316 and 318 connect, through pins 290 and 294, to the control arms 280 and 282, respectively. Thus, the overall length of mechanism 218, between connector pins 290 and 294, can be adjusted by removing one of the pins 290 or 294 and rotating the clevis ends 316 and/or 318 with respect to rod 284, thereby increasing or decreasing the overall length of the rod 284. The desired length is such that doors 194 and 196 abut against each other at points 320 and 322, on each door respectively, at a common point of contact along center line 263.

Referring now to FIG. 14, in which a schematic assembly view of the hopper doors and the hydraulic actuating system in a perspective view is depicted, a hydraulic pressure supply 324 which, in the preferred embodiment, comprises a hydraulic pump 326, which is driven with an electrical motor 328, is interconnected through pressure lines 330 and 332 to both cylinders 206 and 208. Further, advantageously, pressure lines 330 and 332 connect as at T-connectors 334 and 336, and also through lines 338 and 340 to opposite ends of hydraulic cylinder 208. Thus, hydraulic cylinder 280 may be actuated in either direction, as desired, depending upon the pumping direction of pump 324 which, for example, may be determined by the direction of rotation of motor 328, or otherwise with appropriate valves such as with a solenoid valve 326 which changes the direction of hydraulic fluid flow without reversing the direction of motor 328. T-connectors 334 and 336 are also connected to transfer pipes 342 and 344, which communicate the pressurized hydraulic fluid through orifices 310 in door 196, from one end of door 196 to the other end. At the opposite end of door 196, L-connectors may be used to connect transfer pipes 342 and 344 to connector lines 346 and 348, which interconnect with opposite ends of hydraulic cylinder 206. Thus, cylinders 206 and 208 are operated simultaneously, either expanding or contracting, depending upon the pressurization direction from pressure supply 324.

FIG. 15 depicts a partial side cut-away view of a trailer according to the present invention, having hopper 14 held therein. The hydraulic pressure source 324 which, as indicated above, may advantageously be a hydraulic pump 324, which is electrically driven with a motor 328 and/or which has its direction of flow controlled with valve 326, so that electrical controls from the cab of the vehicle may be used to actuate the hydraulic cylinders 206 and 208, as desired, for opening the hopper bay doors 194 and 196. In the embodiment shown, hydraulic pressure lines 330 and 332 are depicted, extending from pressure supply 324, which pressure supply 324 is advantageously positioned between lower pivot point 26 and upper pivot point 72. In this advantageous configuration, pressure lines 330 and 332 need not be inordinately long but are, nevertheless, provided with adequate length and are sufficiently flexible to allow repeated pivoting of the hopper for rear dumping without damaging or fatiguing the pressure supply lines. To facilitate ease of management and to further avoid damage to the pressure supply lines 330 and 332, they may be tethered as at 350, flexibly holding the lines from the hopper so that kinking is further avoided.

Thus, what has been shown is an improved rigidified suspension for a load-carrying trailer vehicle, and particularly, for a dual use end-dumping and belly-dumping trailer.

Figure 16:
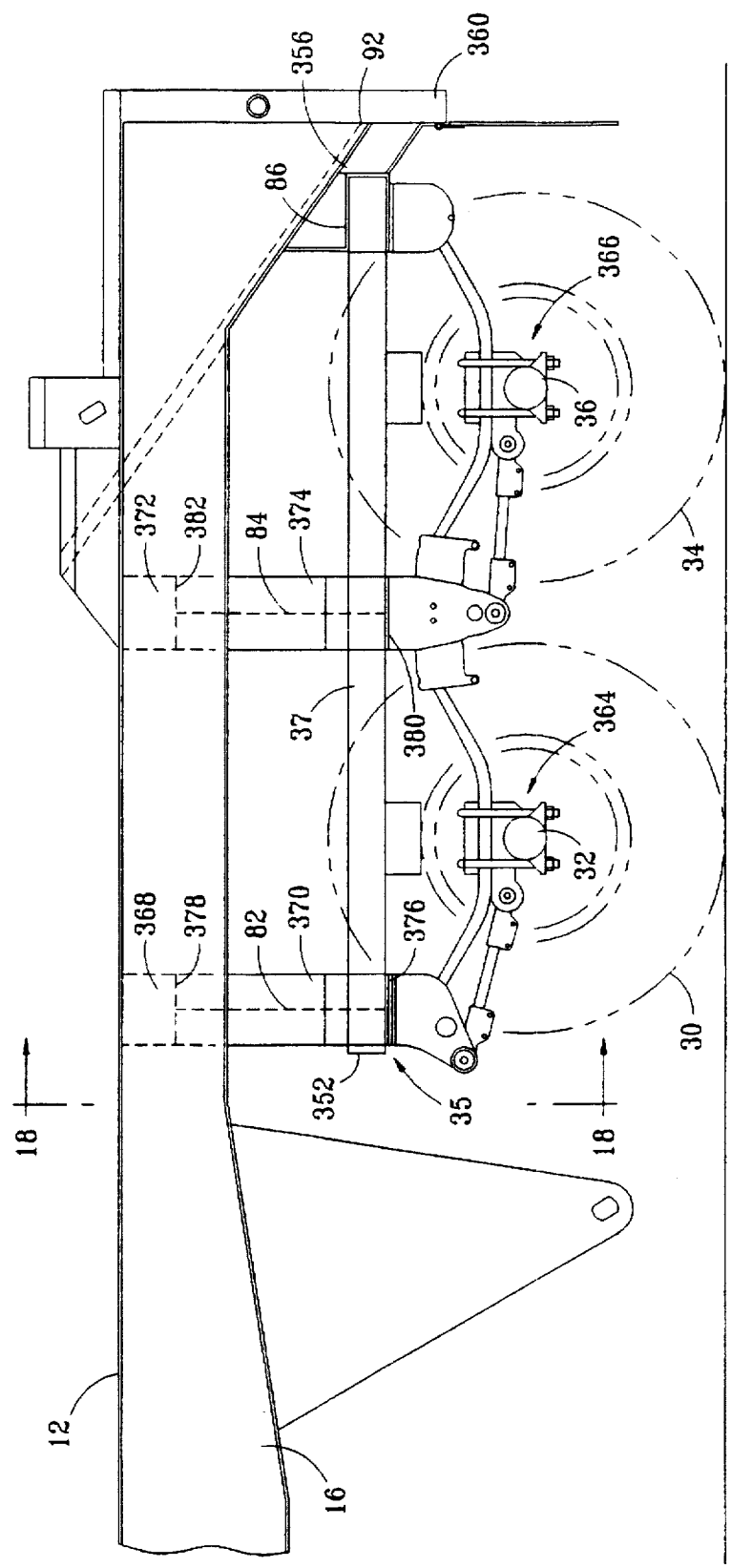
FIG. 16 is an enlarged partial side plan view of a rear portion of a trailer, showing an embodiment of the trailer suspension and construction according to one aspect of the present invention.

FIG. 16 depicts a partial side elevation view of a trailer frame, showing an enlarged detailed view of the rigidified suspension of FIG. 2, by which axles 32 and 36 are provided to attach wheels 30 and 34 to left-side beams 16 (and, also, right-side beam 18, not shown in FIG. 16) of frame 12. Uniquely, suspension rail 37 is horizontally disposed inward from and below frame 16, so that axles 32 and 36 may be attached thereby in close proximity to the rigidified suspension system 35.

Figure 17:
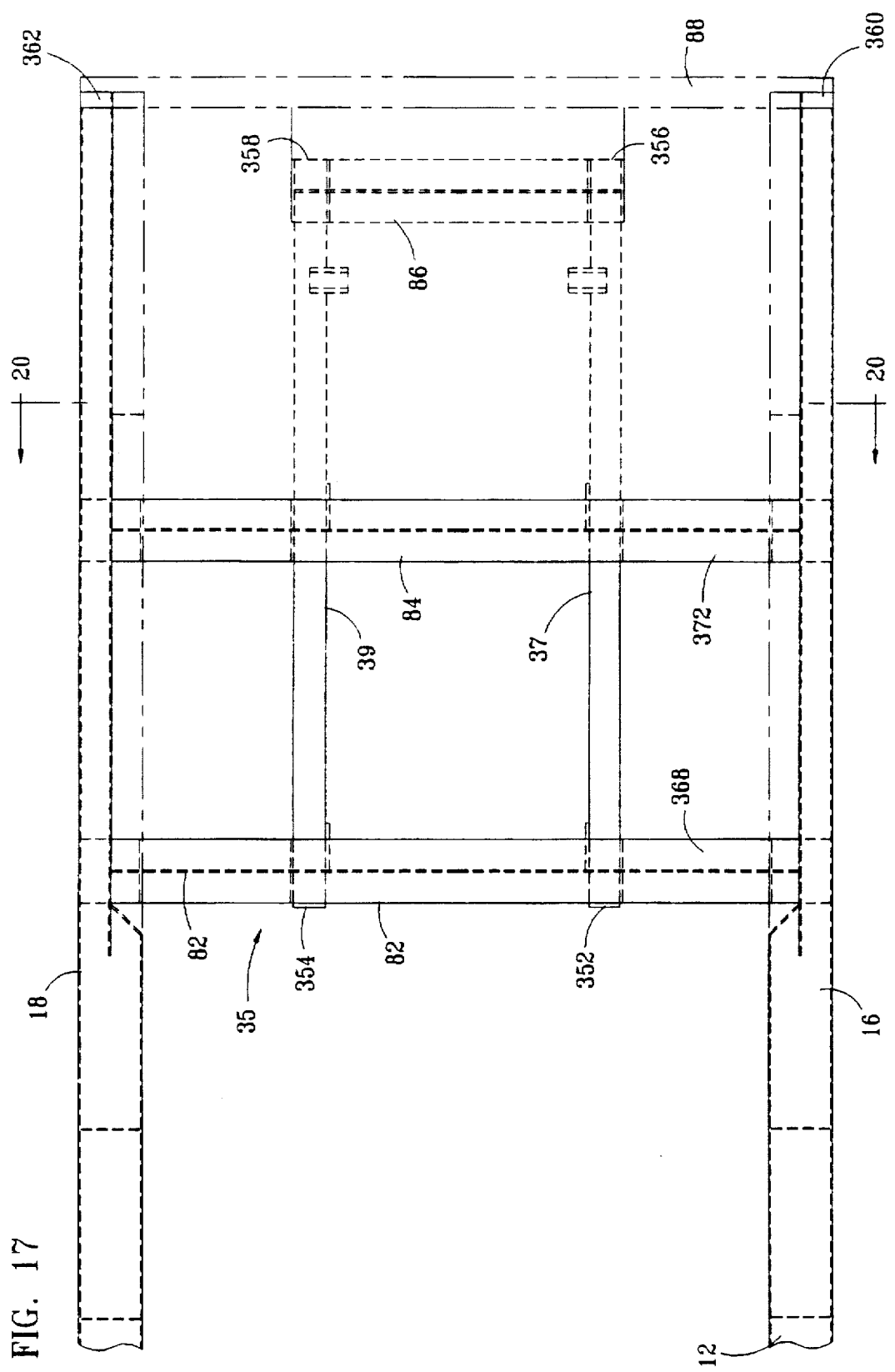
FIG. 17 is a schematic top plan view of a rear portion of a trailer, having one embodiment of the inventive suspension assembly affixed thereto.
Figure 18:
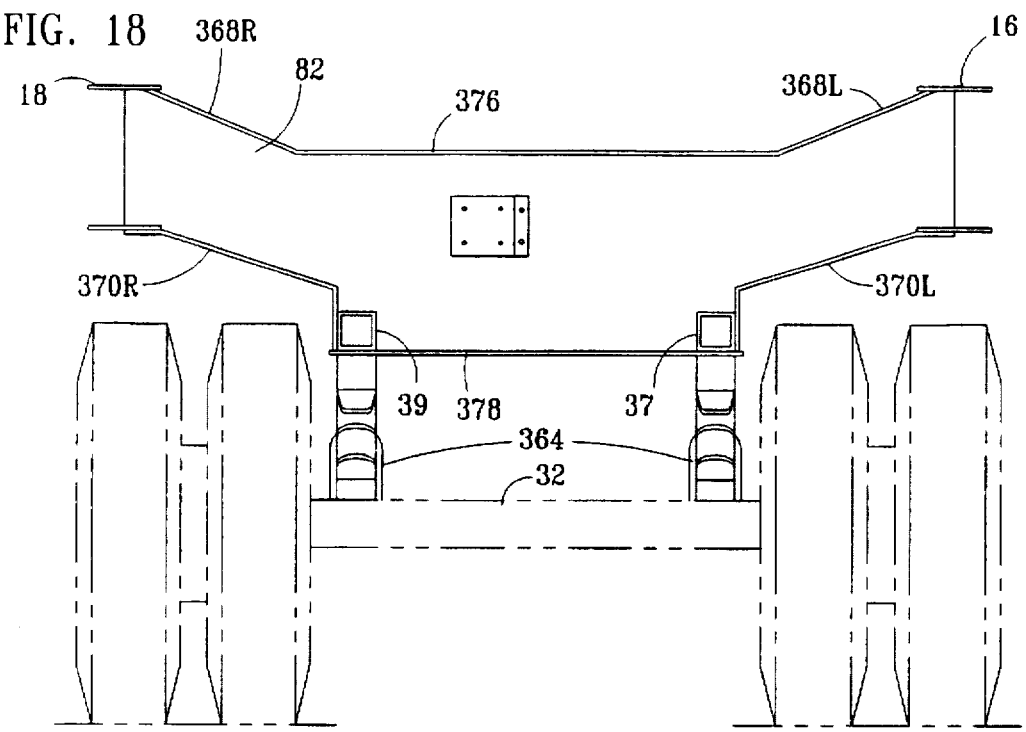
FIG. 18 is a front section view of the rear trailer suspension at section line 18—18 of FIG. 16 and through upper horizontal frame members, looking toward the rear of the trailer.
Figure 19:
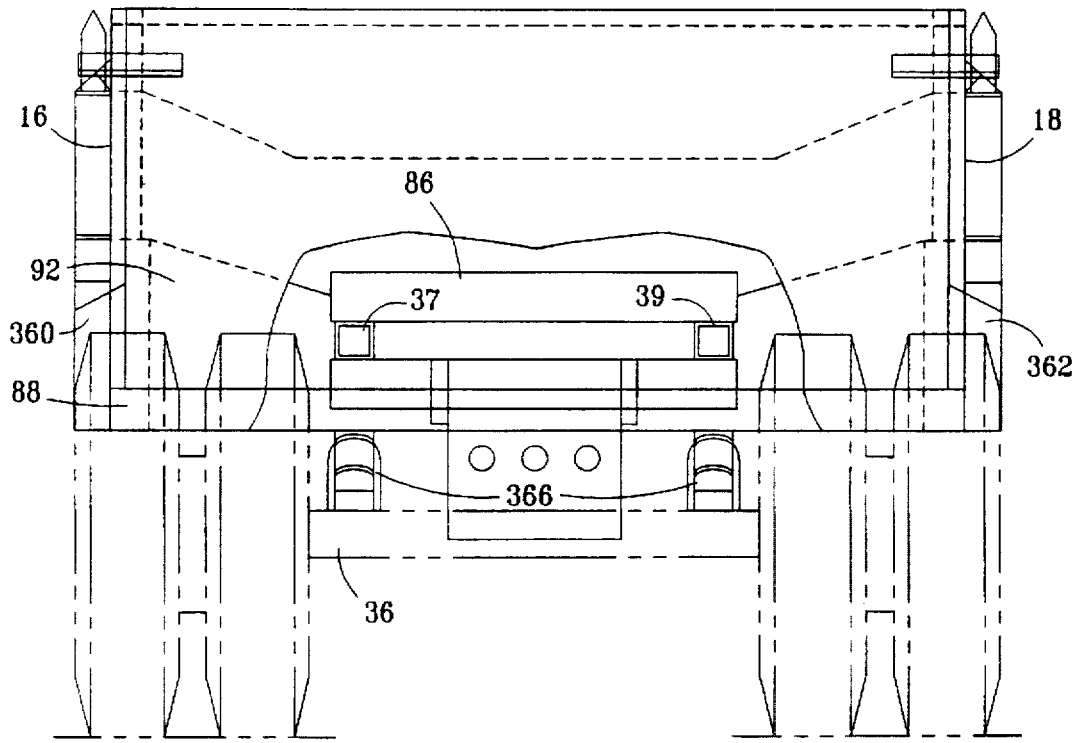
FIG. 19 is a rear elevation view, with a partial cutaway section.
Figure 20:
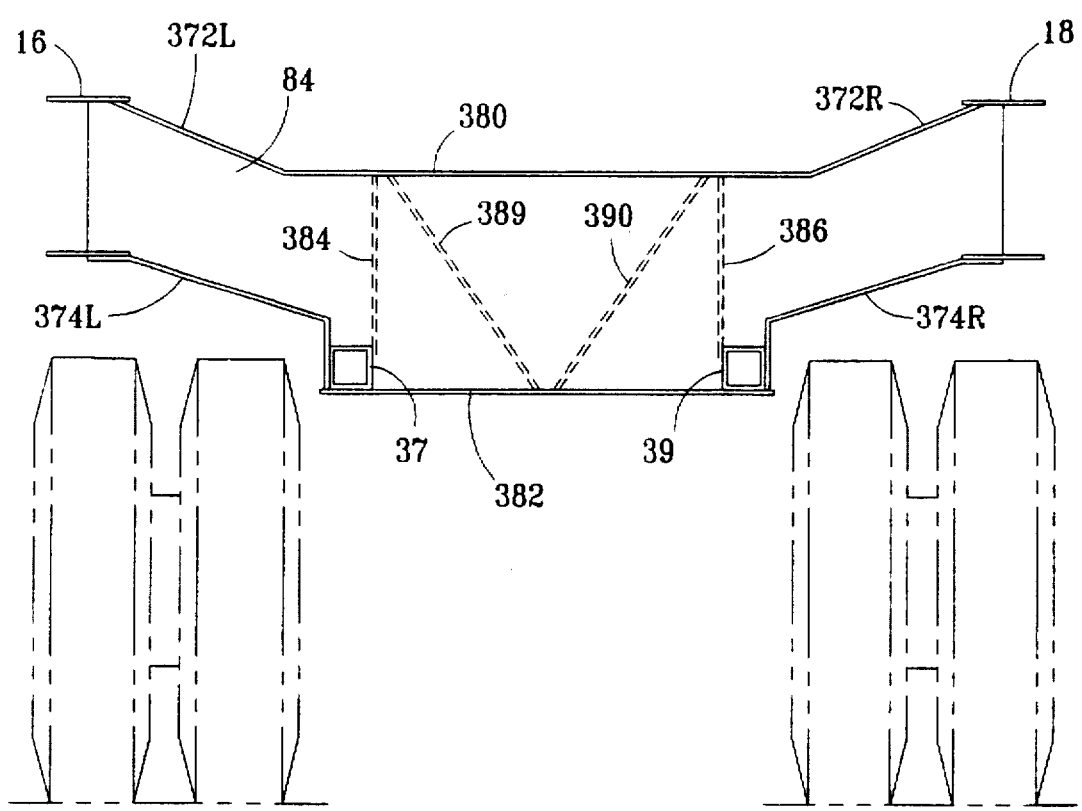
FIG. 20 is a middle section view at section line 20—20 of FIG. 17.

As will be more fully understood with reference to FIGS. 17, 18, 19 and 20, in which FIG. 17 is a top plan view of the rear trailer portion depicted in FIG. 16, FIG. 18 is a section view along section line 18—18 of FIG. 16, FIG. 19 is a rear elevation view, and FIG. 20 is a middle section view along section line 20—20 of FIG. 17, the construction of the rigidified suspension system 35 will be more fully understood. Horizontal left suspension rail 37 and right suspension rail 39 each have corresponding forward ends 352 and 354, respectively, and each also has rearward ends 356 and 358. The forward ends 352 and 354 are rigidly connected to each other and to frame members 16 and 18 through a cross beam 82. The rearward ends 356 and 358 of suspension rails 37 and 39 are attached to the frame rails 16 and 18, using a rear cross beam 86, and may, for example, be attached to both sides of the frame 12 through an angled rear plate 92, which also acts as the rear chute support 92 where the chute 78 is attached, or alternatively, where no chute 78 is formed, may be attached to an end 88 of the trailer frame 12, which end 88 is rigidly affixed to left-side beam 16 and right-side beam 18 as by welding thereto through end plates 360 and 362, which are rigidly affixed to the ends of side beams 16 and 18, respectively. Advantageously, rails 37 and 39 are horizontally disposed inward from and positioned a distance below frame beams 16 and 18, so that axles 32 and 36 and wheels thereon are attached, through spring and shock absorber assemblies 364 and 366, directly to the rigidified suspension assembly 35. Also preferably the forward cross beam 82 and the intermediate cross beam 84 are formed with upper and lower angled brace plates 368 and 370 and 372 and 374, respectively. A horizontal brace portion 376 preferably connects left and right angled brace plates 368. A lower horizontal brace portion 378 preferably connects angled brace portions 370. Upper and lower horizontal brace portions 380 and 382 also preferably connect left and right intermediate angled brace portions 372 and 374. Thus the suspension rails 37 and 39 are supported against side-to-side bending by the cross beams and also from front-to-back bending by attachment at ends 356 and 358 to the angled chute 92, or to frame end 88. The entire suspension is subject to less cantilever bending than other types of suspension by which a plurality of axles are attached through vertically cantilevered arms directly affixed to the frame members 16 and 18. For additional strength and stiffness while keeping the weight at a minimum, vertical bracing members 384 and 386 and angled bracing members 388 and 390 may be used.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A rigidified suspension for a load-carrying vehicle, such as a dual use belly-dumping and end-dumping trailer, of the type having a frame with left and right side beams connected together and having a plurality of axles and wheel assemblies attached, said rigidified suspension comprising:

a) left and right suspension rails, each having a forward end and a rearward end and each being horizontally disposed inward from and below said left and right side beams of said frame;

b) a rear plate fastened to said left and right side beams of said frame and extending downward therefrom adjacent to said rearward end of said left and right suspension rails;

c) a rear cross beam, rigidly fastening said rearward ends of said left and right rails to each other and to said rear plate and thereby to said frame;

d) a forward cross beam rigidly fastening said forward ends of said left and right suspension rails to said frame and to each other; and e) an intermediate cross beam rigidly fastening said left and right suspension rails to said frame at a position intermediate of said forward ends and said rearward ends.

2. A rigidified suspension as in claim 1 wherein said forward cross beam and said intermediate cross beam each comprise a portion rigidly affixed to said side beams and angled downward and inward so that said suspension rails are triangularly supported against side bending.

* * * * *